United States Patent
Sano et al.

(10) Patent No.: US 8,070,468 B2
(45) Date of Patent: Dec. 6, 2011

(54) SHEET FILM FORMING ROLL, SHEET FILM CASTING APPARATUS, FINE PATTERN TRANSFERRING APPARATUS AND SHEET FILM

(75) Inventors: Takayoshi Sano, Fuji (JP); Takashi Hirose, Numazu (JP); Tatsuaki Miyazaki, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 203 days.

(21) Appl. No.: 12/473,579

(22) Filed: May 28, 2009

(65) Prior Publication Data
US 2009/0297649 A1    Dec. 3, 2009

(30) Foreign Application Priority Data

May 28, 2008    (JP) .................... 2008-139658

(51) Int. Cl.
*B29C 59/04*        (2006.01)
*B29C 47/88*        (2006.01)
(52) U.S. Cl. .......... 425/143; 165/89; 425/363; 425/471; 492/10; 492/46
(58) Field of Classification Search ............... 425/143, 425/363, 471; 492/10, 16, 46; 165/89
See application file for complete search history.

(56) References Cited

U.S. PATENT DOCUMENTS

| | | | |
|---|---|---|---|
| 3,470,948 A | 10/1969 | Korsch | |
| 3,490,119 A | 1/1970 | Fukuyama et al. | |
| 3,747,181 A | 7/1973 | Nykopp et al. | |
| 4,068,360 A | 1/1978 | Freuler et al. | |
| 4,071,081 A | 1/1978 | Chielens et al. | |
| 4,233,011 A | 11/1980 | Bolender et al. | |
| 4,440,214 A | 4/1984 | Wedel | |
| 4,823,450 A | 4/1989 | Ramisch et al. | |

(Continued)

FOREIGN PATENT DOCUMENTS

CN    1834567    9/2006

(Continued)

OTHER PUBLICATIONS

Notice of Allowance issued in counterpart Taiwan Application No. 096147234 on Jan. 27, 2010.

(Continued)

*Primary Examiner* — James Mackey
(74) *Attorney, Agent, or Firm* — DLA Piper LLP US

(57) ABSTRACT

A sheet film forming roll includes a center rotary shaft. Fixed end plates are disposed in two locations which are away from each other in an axial direction of the center rotary shaft, respectively. An external cylinder is made of a metal thin film. Two ends of the external cylinder are rotatably supported by the fixed end plates, respectively. Multiple rolling rubber rolls have ends which are rotatably supported by the respective fixed end plates. The rolling rubber rolls are in sliding contact with an outer peripheral surface of the center rotary shaft, and in sliding contact with an inner peripheral surface of the external cylinder. The rolling rubber rolls divide an annular space between the external cylinder and the center rotary shaft into multiple heating medium chambers arranged in a circumferential direction of the sheet film forming roll. A heating medium is configured to be filled in each of the multiple heating medium chambers. At least one heating medium chamber includes a heater which uses electricity as its heat source.

5 Claims, 12 Drawing Sheets

U.S. PATENT DOCUMENTS

| | | | |
|---|---|---|---|
| 5,060,357 | A | 10/1991 | Roerig et al. |
| 5,188,273 | A | 2/1993 | Schmoock |
| 5,567,448 | A | 10/1996 | Frankland |
| 5,943,895 | A | 8/1999 | Lemper |
| 5,984,568 | A | 11/1999 | Lohbeck |
| 5,984,658 | A | 11/1999 | Shimizu |
| 6,129,017 | A | 10/2000 | Mohrmann et al. |
| 7,367,794 | B2 * | 5/2008 | Sano ............... 425/471 |
| 7,811,218 | B2 * | 10/2010 | Sano et al. ........... 492/46 |
| 2004/0113316 | A1 | 6/2004 | Fuji et al. |
| 2006/0211556 | A1 | 9/2006 | Sano |
| 2007/0052118 | A1 | 3/2007 | Kudo et al. |
| 2007/0063376 | A1 | 3/2007 | Sano et al. |
| 2009/0297777 | A1 | 12/2009 | Sano et al. |
| 2010/0119639 | A1 | 5/2010 | Sano et al. |

FOREIGN PATENT DOCUMENTS

| | | | |
|---|---|---|---|
| CN | 1834567 | A | 9/2006 |
| CN | 1928648 | | 3/2007 |
| DE | 1251188 | | 9/1967 |
| DE | 1575524 | | 1/1970 |
| DE | 69731321 | | 10/2005 |
| DE | 102006012398 | | 9/2006 |
| DE | 102006044463 | | 5/2007 |
| JP | H 03-227858 | | 10/1991 |
| JP | 4-164741 | | 6/1992 |
| JP | H08-230018 | | 9/1996 |
| JP | H 10-217314 | | 8/1998 |
| JP | 10-315304 | | 12/1998 |
| JP | 11-207817 | | 8/1999 |
| JP | 11-235747 | | 8/1999 |
| JP | H 11-314263 | | 11/1999 |
| JP | 2000-506795 | | 6/2000 |
| JP | 2000-239409 | | 9/2000 |
| JP | 3194904 | | 8/2001 |
| JP | 3194904 | B2 | 8/2001 |
| JP | 2002-036332 | | 2/2002 |
| JP | 3422798 | | 6/2003 |
| JP | 2005-138509 | | 6/2005 |
| JP | 2006-256159 | | 9/2006 |
| JP | 2007-083577 | | 4/2007 |
| KR | 10-0671216 | | 1/2007 |
| KR | 2007-26264 | | 3/2007 |
| TW | 019205 | | 9/1975 |
| TW | 189464 | | 8/1992 |
| TW | 194705 | | 11/1992 |
| TW | 324686 | | 1/1998 |
| TW | 496797 | | 8/2002 |
| TW | 2007 14452 | | 4/2007 |
| TW | 2007 16356 | | 5/2007 |
| WO | WO 97/34754 | A1 | 9/2007 |

OTHER PUBLICATIONS

Search Report issued in counterpart Taiwan Application No. 096147234 on Jan. 26, 2010.
English abstract of CN1834567A issued on Sep. 20, 2006.
Machine English language translation of JP 319490482 issued on Aug. 6, 2001.
English abstract of TW324686 issued on Jan. 11, 1998.
English abstract of JP-2006-256159.
Machine English language translation of JP-2006-256159.
English abstract of JP-H08-230018 published Sep. 10, 1996.
Machine English language translation of JP-H08-230018 published Sep. 10, 1996.
English abstract of JP-2007-083577 published Apr. 5, 2007.
Machine English language translation of JP-2007-083577 published Apr. 5, 2007.
German Office Action issued in Application No. 102006044463.9-16 mailed Jan. 24, 2008.
English translation of German Office Action issued in Application No. 102006044463.9-16 mailed Jan. 24, 2008.
English translation of DE 1 251 188, published Sep. 28, 1967.
Taiwan IPO Search Report issued in Application No. 095134908 mailed Jul. 30, 2008.
English language abstract of Taiwan IPO Search Report issued in Application No. 095134908 mailed Jul. 30, 2008.
English language translation of TW189464 published Aug. 21, 1992.
English language abstract of TW019205 published Sep. 1, 1975.
Machine English language translation of JP 11-207817 published Aug. 3, 1999.
English language abstract of JP 04-164741 published Jun. 10, 1992.
English language abstract of JP 11-207817 published Aug. 3, 1999.
Office Action issued in Japanese Application No. 2005-275602, dated Feb. 10, 2009.
English language translation of Office Action issued in Japanese Application No. 2005-275602, dated Feb. 10, 2009.
English language abstract of International Application No. WO 97/28950, which was also published as JP 3422798.
Korean Office Action mailed Sep. 18, 2007; Application No. 10-2006-133621.
English translation of Korean Abstract published under Korean Publication No. 10-0671216.
German Office Action issued in Application No. 10 2006 061040.7-16 mailed Mar. 19, 2008.
English Translation of German Office Action issued in Application No. 10 2006 061040.7-16 mailed Mar. 19, 2008.
Chinese Office Action issued in Application No. 200610156230.2 dated Oct. 31, 2008.
English language translation of Office Action issued Chinese Application No. 200610156230.2 dated Oct. 31, 2008.
English Language Machine Translation of JP 2002-036332 published Feb. 5, 2002.
English Language Abstract of JP 2002-036332 published Feb. 5, 2002.
English Language Machine Translation of JP 3422798 published Jun. 30, 2003.
English Language Machine Translation of JP 2000-506795 published Jun. 6, 2000.
Notice of Allowance in Taiwan application No. 0951490256, issued on Jun. 25, 2009.
English Language Abstract of JP 2005-138509 published Jun. 2, 2005.
English Language Machine Translation of JP 2005-138509 published Jun. 2, 2005.
Search Report in Taiwan application No. 095149026, issued on Jun. 25, 2009.
English translation of search report in Taiwan application No. 095149026, issued on Jun. 25, 2009.
English Language Abstract of JP 3422798 published Jun. 30, 2003.
English Language Translation of TW 496797 published Aug. 1, 2002.
English Language Abstract of JP 2000-506795 published Jun. 6, 2000.
English Language Abstract of DE 69731321 published Oct. 20, 2005.
English Language Machine Translation of JP 10-315304.
Korean Office Action mailed Oct. 21, 2009 in Application No. 10-2008-47783.
English Language Abstract of KR 2007-26264 published Mar. 8, 2007.
Partial English Language translation for Korean Office Action mailed Oct. 21, 2009 in Application No. 10-2008-47783.
Notice of Allowance issued in counterpart Taiwan Application No. 096147234 on Jan. 26, 2010.
Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.
English abstract of TW324686 issued on Jan. 11, 1998.
Office Action issued in JP 2005-376468 on Apr. 13, 2010.
English Language Translation of Office Action issued in JP 2005-376468 on Apr. 13, 2010.
Office Action issued in JP 2005-376029 on Apr. 13, 2010.
English Language Translation of Office Action issued in JP 2005-376029 on Apr. 13, 2010.
English Language Abstract of JP 2000-239409 published Sep. 5, 2000.

English machine language translation of JP 2000-239409 published Sep. 5, 2000.
English Language Abstract of JP H 10-217314 published Aug. 18, 1998.
English machine language translation of JP H 10-217314 published Aug. 18, 1998.
English Language Abstract of JP 2007-083577 published Apr. 5, 2007.
English machine language translation of JP 2007-083577 published Apr. 5, 2007.
English Language Abstract of JP H 11-314263 published Nov. 16, 1999.
English machine language translation of JP H 11-314263 published Nov. 16, 1999.
USPTO Image File Wrapper of Related U.S. Appl. 11/614,223 as of Sep. 16, 2010.
USPTO Image File Wrapper of Related U.S. Appl. No. 11/534,339 as of Sep. 16, 2010.
USPTO Image File Wrapper of Related U.S. Appl. No. 12/518,511 as of Sep. 16, 2010.
English Language Abstract of JP 3-227858 published Oct. 8, 1991.
International Search Report issued in PCT/JP2007/073797 published Feb. 5, 2008.
English abstract of JP-11-235747 published Aug. 31, 1999.
Machine English language translation of JP-11-235747 published Aug. 31, 1999.
English abstract of JP-10-315304 published Dec. 2, 1998.
Office Action issued in Chinese Appl 200810109176.5 on Mar. 8, 2010.
English Language Translation of Office Action issued in Chinese Appl 200810109176.5 on Mar. 8, 2010.
Decision of Refusal issued in Chinese Appln. 200810109176.5 on Nov. 9, 2010.
English Translation of Decision of Refusal issued in Chinese Appln, 200810109176.5 on Nov. 9, 2010.
English Language Abstract of CN 1928648 published Mar. 14, 2007.
Office Action issued in TW97119277 on Dec. 3, 2010.
English Language Translation of Office Action issued in TW97119277 on Dec. 3, 2010.
English Language Abstract of TW200716356 published May 1, 2006.
English Language Abstract of TW200714452 published on Apr. 16, 2007.
USPTO Image File Wrapper of Related U.S. Appl. No. 11/614,223 on Sep. 17, 2010 to Jun. 30, 2011.
USPTO Image File Wrapper of Related U.S. Appl. No. 11/534,339 on Sep. 17, 2010 to Jun. 30, 2011.
Korean Office Action issued in KR Appl. No. 10-2009-46394 on Nov. 19, 2010.
Partial English Language Translation of Korean Office Action issued in KR Appl. No. 10-2009-46394 on Nov. 19, 2010.
Chinese Office Action issued in CN 200810109176.5 on May 25, 2011.
English Language Translation of Chinese Office Action issued in CN 200810109176.5 on May 25, 2011.

* cited by examiner

SHEET FILM FORMING ROLL, SHEET FILM CASTING APPARATUS, FINE PATTERN TRANSFERRING APPARATUS AND SHEET FILM

BACKGROUND OF THE INVENTION

1. Field of the Invention

The present invention relates to a sheet film forming roll, a sheet film casting apparatus, a fine pattern transferring apparatus and a sheet film. The present invention relates particularly to a temperature-controllable sheet film forming roll whose roll surface temperature varies from one place to another in a circumferential direction of the roll.

2. Description of the Related Art

One of such temperature-controllable sheet film forming rolls each whose roll surface temperature varies from one place to another in the roll circumferential direction includes: a fixed internal cylinder; a rotatable external cylinder disposed concentric with the internal cylinder; an annular medium passage formed by an interstice between the outer peripheral surface of the internal cylinder and the inner peripheral surface of the external cylinder; multiple partitioning members extending in the axial direction of the internal cylinder, and thereby partitioning and dividing the annular medium passage into multiple smaller medium passages arranged in the circumferential direction; multiple slit-shaped medium inlet ports drilled in the thickness portion of the internal cylinder at positions different in the circumferential direction of the internal cylinder so as to communicate respectively with the smaller medium passages, the medium inlet ports extending in the axial direction of the internal cylinder; and multiple slit-shaped medium outlet ports drilled in the thickness portion of the internal cylinder at positions different in the circumferential direction of the internal cylinder so as to communicate respectively with the smaller medium passages, the medium outlet ports extending in the axial direction of the internal cylinder.

This technology is disclosed in Japanese Patent Application Laid-Open No. 2006-256159 (Patent Document 1).

The sheet film forming roll needs to be made with a thin structure which causes the external cylinder (external barrel) to have a smaller heat capacity for the purpose of making the roll surface temperature of the sheet film forming roll clearly vary among the temperature controlling zones partitioned in the roll circumferential direction while the sheet film forming roll is rolling.

In this respect, the conventional type of sheet film forming roll can be employed in sheet film casting or the like by sheet forming film methods with no large pressing force applied to the external cylinder, including a peening forming method and an air-chamber forming method. However, the conventional type of sheet film forming roll cannot be employed to cast a sheet film using touch rolls that press a resin against the roll surface while casting the resin. Since the external cylinder is made to have a thin structure with a smaller heat capacity, the pressing of the touch rolls deforms the external cylinder, and thus hinders the resin from receiving a sufficient pressing force. As a result, no sheet film is casted correctly.

Furthermore, the conventional type of sheet film forming roll makes it difficult to appropriately set the temperatures for the respective medium passages (heating medium chambers) whose temperatures should be different from one another, because the heating medium leaks from and to the medium passages.

SUMMARY OF THE INVENTION

The present invention has been made with the above-described problems taken into consideration. Consequently, an object of the present invention is to provide a temperature-controllable sheet film forming roll which can be applied to the casting of a sheet film by use of touch rolls, and which enables the temperatures of the respective heating medium chambers to be set independently and adequately so that the roll surface temperature varies from one heating medium chamber to another in the roll circumferential direction.

For the purpose of fulfilling the object, a first aspect of the present invention is a sheet film forming roll including: a center rotary shaft rotatably supported by bearing members; fixed end plates concentrically disposed in two locations which are away from each other in an axial direction of the center rotary shaft, respectively; an external cylinder made of a metal thin film, and rotatably supported, at two ends thereof, by the respective fixed end plates, the external cylinder being concentric with the center rotary shaft; and multiple rolling rubber rolls each rotatably supported, at two ends thereof, by the respective fixed end plates, the plurality of rolling rubber rolls being in sliding contact with an outer peripheral surface of the center rotary shaft, and being in sliding contact with an inner peripheral surface of the external cylinder. In the foregoing configuration of the sheet film forming roll, the rolling rubber rolls divide an annular space between the external cylinder and the center rotary shaft into multiple heating medium chambers arranged in a circumferential direction of the sheet film forming roll; a heating medium is configured to be filled in each of the multiple heating medium chambers; and out of the heating medium chambers, at least one heating medium chamber is provided with at least one of a heater which uses electricity as its heat source and a heater which uses steam as its heat source.

A second aspect of the present invention is the sheet film forming roll according to the first aspect, further including: a temperature sensor configured to sense a temperature of the heating medium in the heating medium chamber provided with the heater; and a controller configured to control an amount of heat emitted from the heater depending on the temperature sensed by the temperature sensor.

A third aspect of the present invention is the sheet film forming roll according to any one of the first and second aspects, further including an adjuster configured to adjust a temperature of the heating medium in the heating medium chamber including no heater out of the heating medium chambers.

A fourth aspect of the present invention is a touch-roll type of sheet film casting apparatus employing the sheet film forming roll according to any one of the first to third aspects as its main roll.

A fifth aspect of the present invention is a fine pattern transferring apparatus employing the sheet film forming roll according to any one of the first to third aspects as its main roll.

A sixth aspect of the present invention is a sheet film produced by use of the touch-roll type of sheet film casting apparatus according to the fourth aspect.

A seventh aspect of the present invention is a sheet film produced by use of the fine pattern transferring apparatus according to the fifth aspect.

The rolling rubber rolls divide the annular space between the external cylinder and the center rotary shaft into the multiple heating medium chambers arranged in the circumferential direction of the sheet film forming roll, and the rolling rubber rolls operate as backup rollers for the external cylinder. For this reason, the sheet film forming roll according to the present invention enables the external cylinder to provide a sufficient pressing force to a sheet film without allowing the external cylinder to deform while doing things such as casting the sheet film by use of touch rolls, even if the external cylinder is made with a thin structure whose heat capacity is small for the purpose of making the roll surface temperature clearly different among temperature controlling zones dividedly arranged in the roll circumferential direction. Consequently, the sheet film forming roll is capable of adequately performing things such as casting the sheet film by use of the touch rolls.

BRIEF DESCRIPTION OF THE ACCOMPANYING DRAWINGS

DESCRIPTION OF THE PREFERRED EMBODIMENTS

Figure 1:
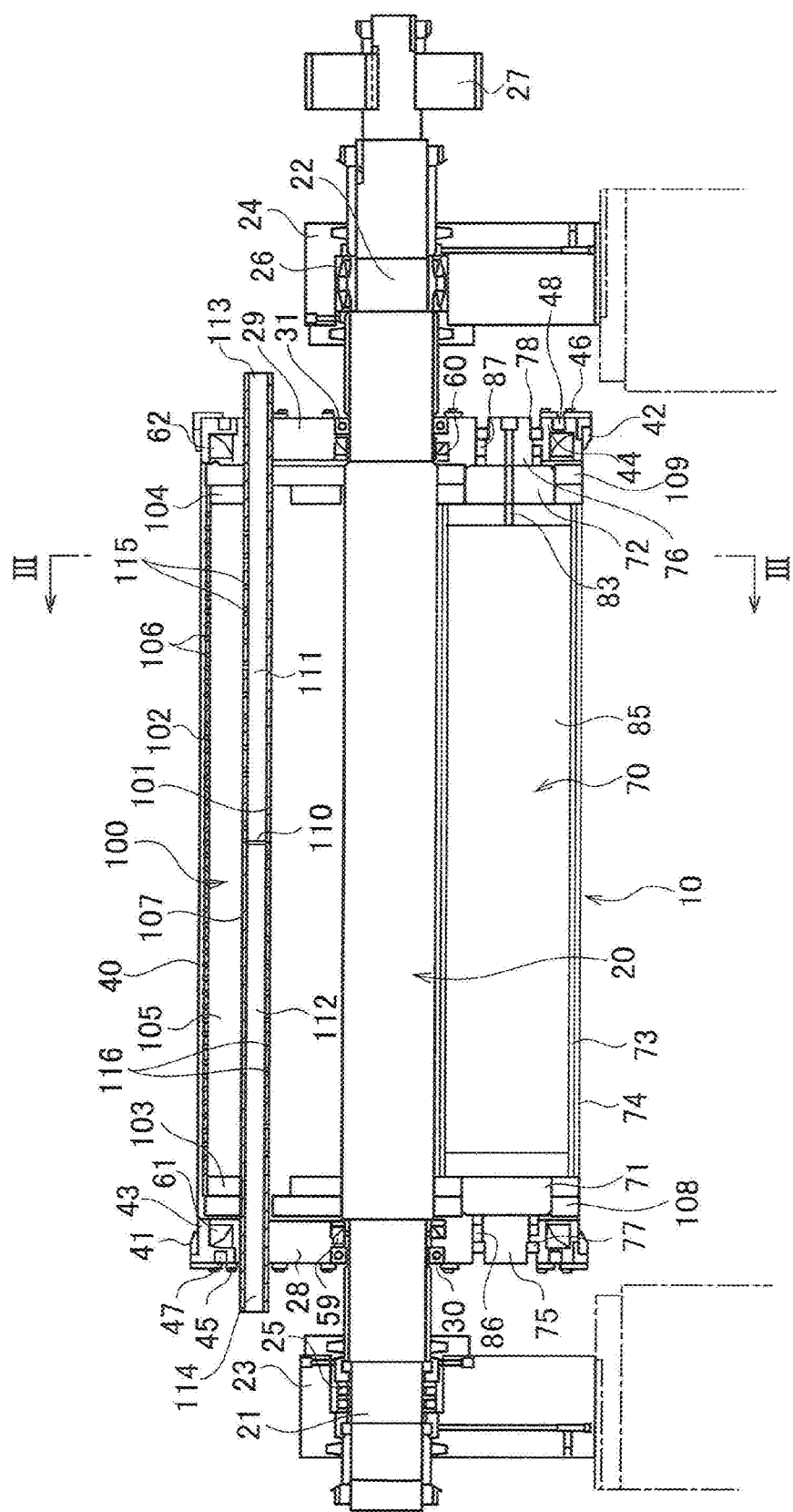
FIG. 1 is a longitudinal sectional view showing an embodiment of a sheet film forming roll according to this invention.
Figure 2:
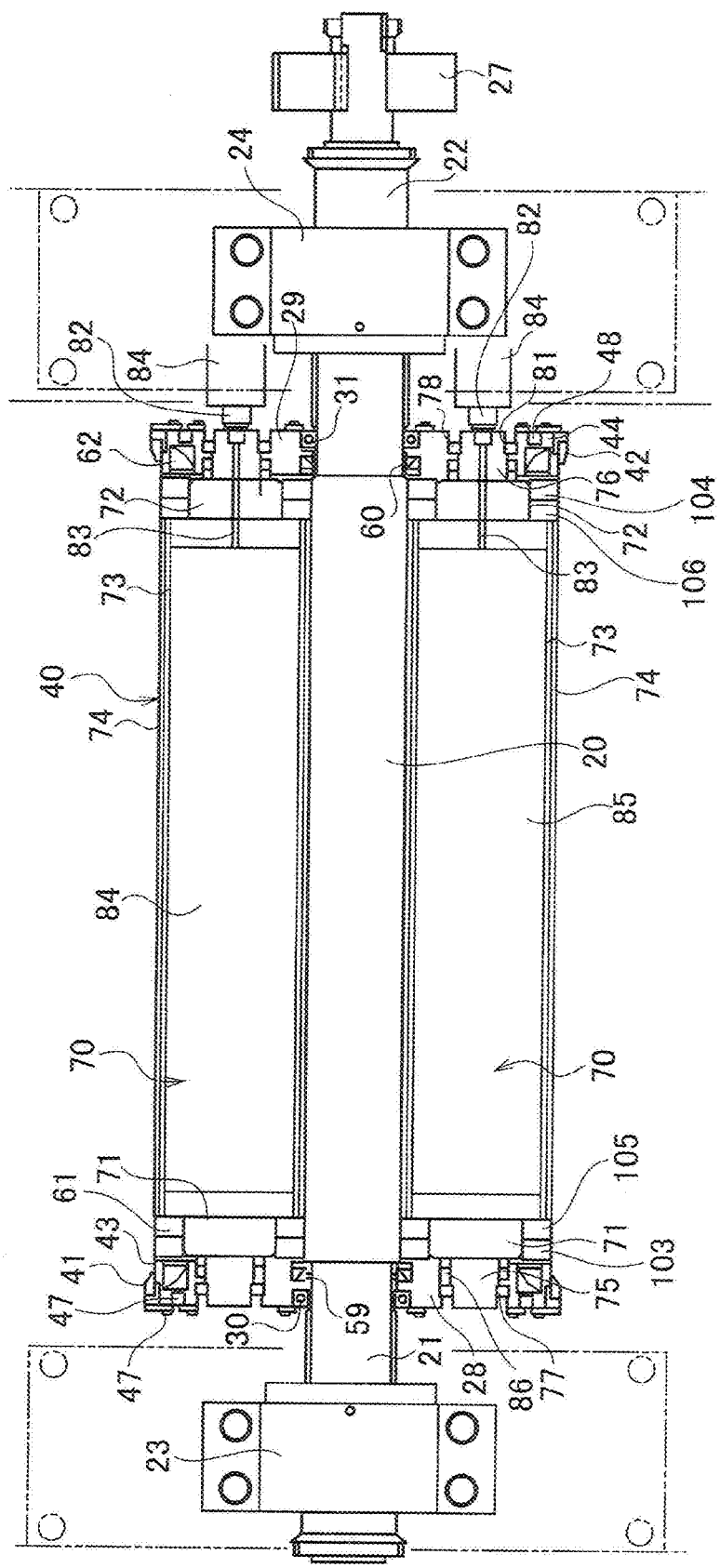
FIG. 2 is a plan sectional view showing the embodiment of the sheet film forming roll according to this invention.

Referring to FIGS. 1 to 5, descriptions will be provided for an embodiment of a sheet film forming roll according to this invention.

As shown in FIGS. 1 to 4, a sheet film forming roll 10 includes a center rotary shaft 20, an external cylinder (thin sleeve) 40, four rolling rubber rolls 70, and a heating-medium supplying and discharging mechanism 100.

The center rotary shaft 20 is rotatably supported in a way that its end portions 21, 22 turn on a work-side bearing 23 and a drive-side bearing 24 of the film forming apparatus with bearing members 25, 26 interposed in between, respectively. A timing pulley 27 configured to rotationally drive the center rotary shaft 20 is attached to the end portion 22 side of the center rotary shaft 20. The timing pulley 27 is coupled to an electric motor (whose illustration is omitted) by use of a timing belt, which is not illustrated. Thus, the timing pulley 27 is rotationally driven by the electric motor.

The center rotary shaft 20 supports a disc-shaped work-side end plate 28 and a disc-shaped drive-side end plate 29 at their respective two locations away from each other in the axial direction (at leftward and rightward locations in FIGS. 1, 2 and 4) with a ball bearing 30 interposed between the center rotary shaft 20 and the work-side end plate 28, and with a ball bearing 31 interposed between the center rotary shaft 20 and the drive-side end plate 29. The work-side end plate 28 and the drive-side end plate 29 are fixed end plates which do not rotate. The work-side end plate 28 and the drive-side end plate 29 are fixedly connected to the work-side bearing 23 and the drive-side bearing 24, respectively, with connecting members and the like (not illustrated) interposed in between. The work-side end plate 28 and the drive-side end plate 29 are concentrically disposed on the center rotary shaft 20 in an unrotatable manner. In this respect, the "concentrically disposed" means that the peripheral surfaces of the work-side bearing 23 and the drive-side bearing 24 are concentric with the center rotary shaft 20.

The external cylinder 40 is a cylindrical body formed of a thin film made of a metal such as a stainless steel. The external cylinder 40 has a flexible thin structure and is elastically deformable. Annular end-portion rigid members 43, 44 are fixedly attached to the left and right end portions of the external cylinder 40 by use of annular retainer band members 41, 42, respectively. The end-portion rigid members 43, 44 are rotatably supported by the work-side end plate 28 and the drive-side end plate 29 with ball bearings 47, 48 interposed in between, respectively. In this respect, the ball bearings 47, 48 are attached to outer peripheral portions of the work-side end plate 28 and the drive-side end plate 29 by use of bearing fixing rings 45, 46, respectively. This makes the external cylinder 40 disposed concentric with the center rotary shaft 20, and accordingly rotatable about the center axis of the center rotary shaft 20.

Figure 3:
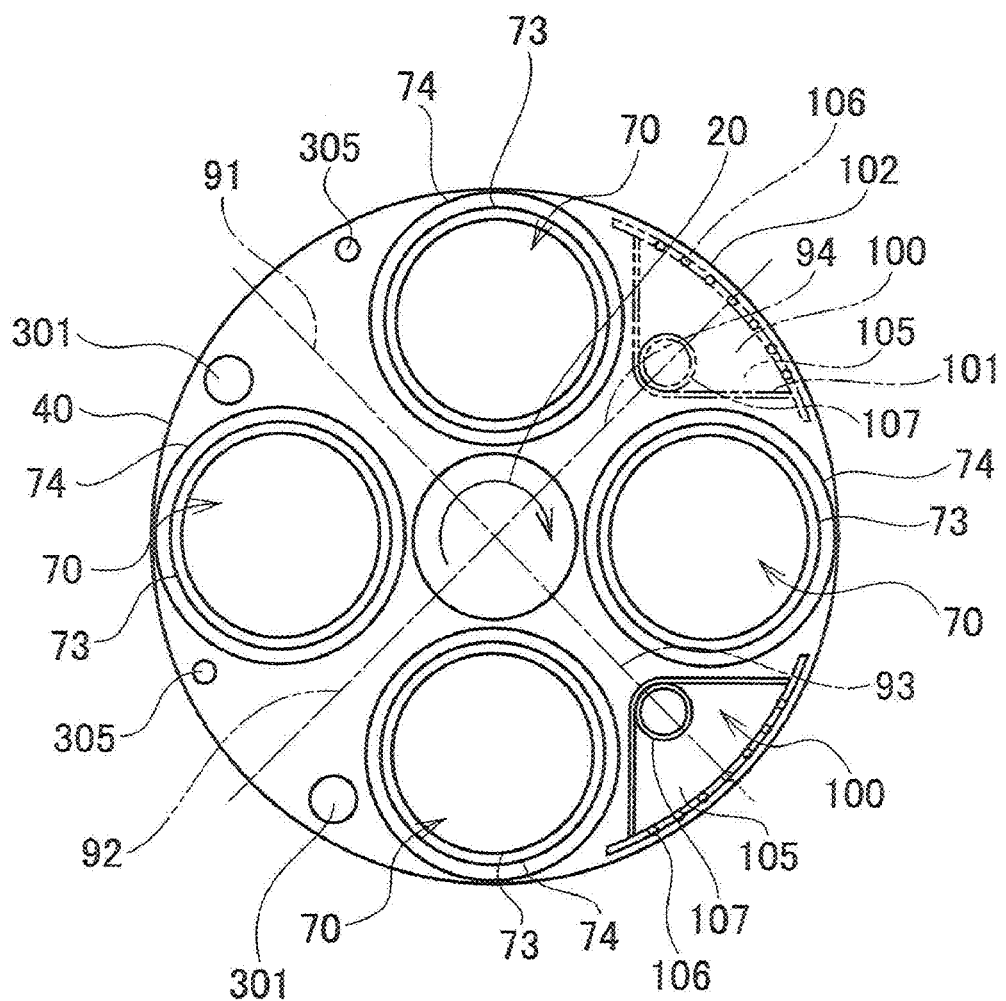
FIG. 3 is a cross-sectional view of the sheet film forming roll taken along the III-III line of FIG. 1.
Figure 5:
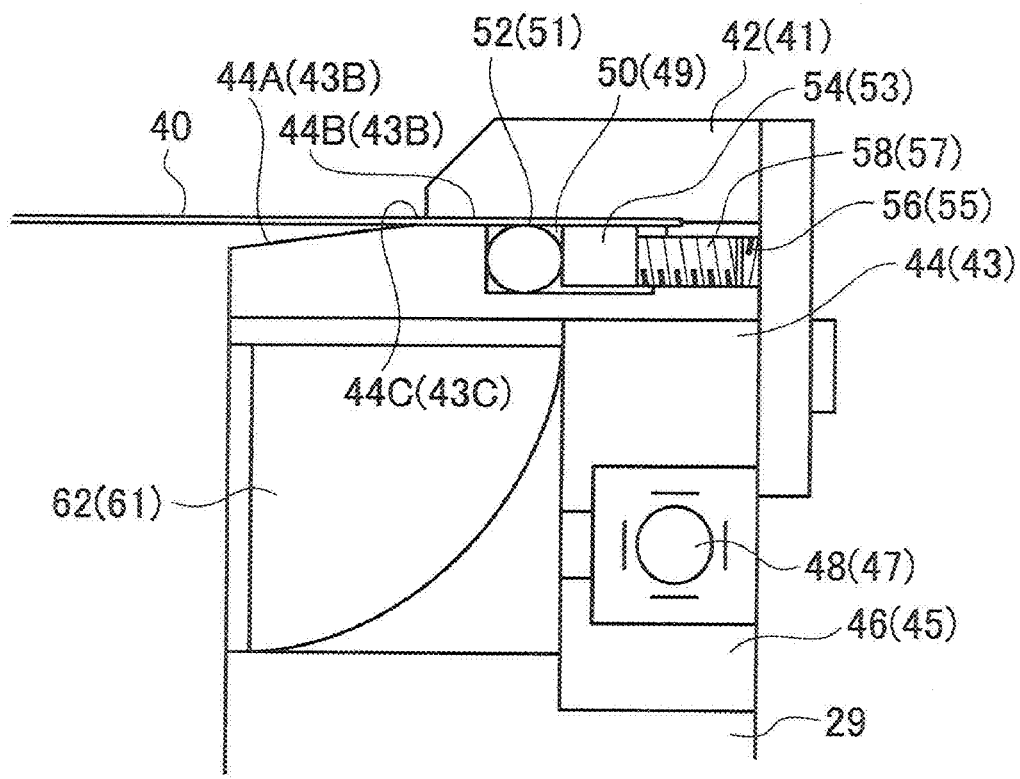
FIG. 5 is an enlarged, cross-sectional view of an external cylinder attachment part of the sheet film forming roll according to the present embodiment.

Referring to FIG. 5, detailed descriptions will be provided for structures in which the end-portion rigid members 43, 44 are connected to the external cylinder 40 by use of the retainer band members 41, 42, respectively. The structure in which the end-portion rigid member 43 is connected to the external cylinder 40 on the left side and the structure in which the end-portion rigid member 44 is connected to the external cylinder 40 on the right side are symmetrical with each other, and have the same configuration. For this reason, FIG. 3 illustrates the connecting structure on the right side. The connecting structure on the left side will be omitted from FIG. 3, except that the corresponding components are denoted by the same reference numerals.

The end-portion rigid members 43, 44 are inserted and thus fitted into the external cylinder 40 at the respective two axial end portions. Wide concave grooves (peripheral grooves) 49, 50 are formed in the respective outer peripheral portions of the end-portion rigid members 43, 44, where the end-portion rigid members 43, 44 are fitted into the inner peripheral surface of the external cylinder 40. O-rings 51, 52 each made of a rubber-type elastic body are fitted into, and thus attached to, the concave grooves 49, 50, respectively.

The concave grooves 49, 50 are formed as wide O-ring grooves with the following specifications. The depths of the grooves are equal to or larger than the line diameters of the O-rings 51, 52 which are placed in a free measurement condition, respectively. In other words, the grooves are deeper than a normally-specified value by approximately 0.05 mm to 0.3 mm. The width measurements of the grooves are fully wider than the line diameters of the O-rings 51, 52, respectively. In other words, the grooves are approximately 2.0 to 2.5 times as wide as the line diameters thereof. In this respect, the "free measurement condition" means a condition in which the O-rings 51, 52 are not elastically deformed.

Collar members 53, 54 each made of a metal are disposed in the concave grooves 49, 50 in a way that the collar members 53, 54 adjoin the O-rings 51, 52 in the horizontal width direction. Each of the collar members 53, 54 is divided into at least two pieces in order that the collar members 53, 54 should be fitted into the respective concave grooves 49, 50. The collar members 53, 54 are disposed in the concave grooves 49, 50 toward the outsides of the end-portion rigid members 43, 44 from the O-ring 51, 52 in such a way as to adjoin the O-ring 51, 52, respectively (in the case of the concave groove 50 in the right end-portion rigid member 44, the collar member 54 is disposed on the right of the O-ring 52 in such a way as to adjoin the O-ring 52). The collar members 53, 54 are movable in the axial directions (leftward and rightward) in the insides of the concave grooves 49, 50. The outside diameters of the collar members 53, 54 attached to the concave grooves 49, 50 are set at dimensions equal to or smaller than the outside diameters of the end-portion rigid members 43, 44, respectively.

Screw holes 55, 56 are formed in, and thus penetrate, the respective end-portion rigid members 43, 44. The screw holes 55, 56 are opened from the external end surfaces of the end-portion rigid members 43, 44 to the groove-side wall surfaces of the concave grooves 49, 50. The multiple screw holes 55, 56 are provided to each of the end-portion rigid member 43 and 44 in such a way as to be disposed in the circumferential direction of the end-portion rigid member 43, 44. Multiple screw members 57, 58 engage with the respective multiple screw holes 55, 56. The distal ends of the screw members 57, 58 abut on the side surfaces of the collar members 53, 54, respectively. Thus, the screw members 57, 58 press the collar members 53, 54 to the O-ring 51, 52 depending on how far the screw members 57, 58 are screwed into the screw holes 55, 56.

The retainer band members 41, 42 each with a metal-made rigid structure are fitted and thus attached to the outer peripheries of the two axial end portions (corresponding to the concave grooves 49, 50) of the external cylinder 40, respectively. The retainer band members 41, 42 are fitted into the outer periphery of the external cylinder 40, and thus prevent the external cylinder 40 from deforming in such a way as to swell in a direction in which the diameter of the external cylinder 40 expands.

The end-portion rigid members 43, 44 are attached to the external cylinder 40 with the following sequence. First of all, the O-rings 51, 52 and the collar members 53, 54 are fitted into the concave grooves 49, 50, respectively. Subsequently, the screw members 57, 58 are screwed into their respective screw holes to such an loose extent that the screw members 57, 58 do not press their collar members 53, 54 to the corresponding 20 O-rings 51, 52, and that the O-rings 51, 52 are accordingly left in their free measurement condition. Thereafter, the end-portion rigid members 43, 44 are inserted into the external cylinder 40 from the respective opening portions located in the left and right axial ends of the external cylinder 40 with the screw members 57, 58 remaining loosely screwed into their corresponding screw holes, before no retainer band members 41, 42 are attached to the left and right axial end portions of the external cylinder 40.

When the end-portion rigid members 43, 44 are inserted into the external cylinder 40, the O-rings 51, 52 are put in the free measurement condition. For this reason, the depths of the concave grooves 49, 50 are equal to or more than the line diameters of the O-rings 51, 52 which are put in the free measurement condition. Thus, the entire O-rings 51, 52 are accommodated in the insides of the concave grooves 49, 50, and no portions of the O-rings 51, 52 are located in the outsides of the outer peripheral surfaces of the end-portion rigid members 43, 44, respectively. Consequently, the end-portion rigid members 43, 44 can be inserted into the thin external cylinder 40 smoothly and easily with a lower frictional resistance while the O-rings 51, 52 are not pressed against the inner peripheral surface of the external cylinder 40. In addition, it is accordingly possible to avoid the O-rings 51, 52 being damaged when the end-portion rigid members 43, 44 are inserted into the external cylinder 40.

For the purpose of making this insertion work easier, tapered outer peripheral surfaces 43A, 44A which become gradually smaller in diameter toward their ends are formed in the insertion-side end portions of the end-portion rigid members 43, 44. In addition, connection parts 43C and 44C each between a corresponding pair of the tapered outer peripheral surface 43A, 44A and a straight outer peripheral surface 43B, 44B under which the concave groove 49, 50 are formed have curved surfaces.

After the insertion work is completed, the retainer band members 41, 42 are fitted and thus attached to the outer peripheries of the two axial end portions of the external cylinder 40, respectively. Thereafter, the screw members 57, 58 are screwed into their corresponding screw holes. Thereby, the collar members 53, 54 are pressed against the respective O-rings 51, 52. Consequently, the O-rings 51, 52 are elastically deformed. Depending on how far the screw members 57, 58 are screwed into their corresponding screw holes, the O-rings 51, 52 are elastically deformed in a way that the O-rings 51, 52 are compressed. between the end-portion rigid members 43, 44 and the external cylinder 40, respectively. The retainer band members 41, 42 prevent the external cylinder 40 from deforming in such a way as to swell due to repulsive forces produced by the elastic deformations of the O-rings 51, 52, respectively.

By this, the end-portion rigid members 43, 44 are fluid-tightly connected to the external cylinder 40 in a way that the end-portion rigid members 43, 44 are immovable relative to the external cylinder 40 because of frictional resistances which occurs between the end-portion rigid members 43, 44 and the external cylinder 40 due to the repulsive forces produced by the elastic deformations of the O-rings 51, 52, respectively. Simultaneously, the retainer band members 41, 42 are connected to the external cylinder 40 in a way that the. retainer band members 41, 42 are immovable relative to the external cylinder 40 because of frictional resistances which occur between the retainer band members 41, 42 and the external cylinder 40 due to the repulsive forces produced by the elastic deformations of the O-rings 51, 52.

The fluid-tight connections between the external cylinder 40 and the end-portion rigid members 43, 44 become stable in strength because of the O-rings 51, 52 which are elastically deformed while the retainer band members 41, 42 prevent the external cylinder 40 from deforming in such a way as to swell as described above. In addition, it is also possible to increase the pressure withstanding strengths of the connections between the external cylinder 40 and the end-portion rigid members 43, 44 when the amounts of elastic deformations of the O-rings 51, 52 are increased. The amounts of elastic deformations of the O-rings 51, 52 can be freely set at arbitrary values by controlling how far the screw members 57, 58 are screwed into their corresponding screw holes, respectively.

This connection structure makes it easy to disassemble the end-portion rigid members 43, 44 from the external cylinder 40 when the disassembly work is carried out in a sequence reverse to the sequence in which the insertion work is carried out. Consequently, this connection structure makes the maintainability better.

As shown in FIGS. 1 to 4, the four rolling rubber rolls 70 have the same structure. Each rolling rubber roll 70 is configured as a hollow cylindrical body including: left and right axial end members 71, 72; a metal-made cylindrical body 73 constructed between and integrated with the left and right axial end members 71, 72; and a cylindrical rubber 74 made of a rubber-type elastic body attached to the outer periphery of the metal-made cylindrical body 73.

Each rolling rubber roll 70 is supported by the work-side end plate 28 and the drive-side end plate 29 with a ball bearing 77 interposed between the work-side end plate 28 and a supporting shaft 75 formed in the axial end member 71 of the rolling rubber roll 70, and with a ball bearing 78 interposed between the drive-side end plate 29 and a supporting shaft 76 formed in the axial end member 72 of the rolling rubber roll 70, in a way that the rubber roll 70 is rotatable about its own axis.

The four rolling rubber rolls 70 are disposed about the center axis of the center rotary shaft 20 at equal intervals of a rotational angle of 90 degrees. The four rolling rubber rolls 70 slidingly contact (press-contact) the outer peripheral surface of the center rotary shaft 20 with their respective cylindrical rubbers 74 interposed in between. In addition, the four rolling rubber rolls 70 slidingly contact (press-contact) the inner peripheral surface of the external cylinder 40 with their respective cylindrical rubbers 74 interposed in between.

This makes the rotation of the center rotary shaft 20 transmitted to the rolling rubber rolls 70 due to their frictional forces, and accordingly makes the rolling rubber rolls 70 rotate about their own axes. Thereby, the rotations of the respective rolling rubber rolls 70 are transmitted to the external cylinder 40 due to their frictional forces. Consequently, the external cylinder 40 rotates about the center axis of the center rotary shaft 20.

Not that, while no load is imposed on the external cylinder 40 of the sheet film forming roll 10 (while no external force is imparted to the external cylinder 40 of the sheet film forming roll 10 through the touch roll of the like), the rolling rubber rolls 70 may be set up in such a way as to be in contact with neither the center rotary shaft 20 nor the external cylinder 40 by making a small gap between each rolling rubber roll 70 and the center rotary shaft 20, as well as between each rolling rubber roll 70 and the external cylinder 40.

In a case where, as shown in FIG. 3, the center rotary shaft 20 is driven in the clockwise direction by the motor, each rolling rubber roll 70 rolls in the counterclockwise direction, and the external cylinder 40 accordingly rotates in the counterclockwise direction.

A hydraulic pressure supplying port 83 is formed in the axial end member 72 of each rolling rubber roll 70. A hydraulic pressure supplier 84 located outside of the roll is connected to each hydraulic pressure supplying port 83 by use of a corresponding rotary joint 82. The hydraulic pressure supplying ports 83 are configured to introduce hydraulic pressures from the hydraulic pressure suppliers 84 to intra-roll spaces 85, respectively. In other words, the rolling rubber rolls 70 are hollow rolls, and the hydraulic pressures are supplied to the intra-roll spaces 85 through the rotary joints 82, respectively. Thus, the pressures in the intra-roll spaces can be variably set, respectively.

This scheme enables the internal pressures in intra-roll spaces 85 to be variably set by the hydraulic pressures, respectively, even while the rolling rubber rolls 70 are rotating (rolling). Thereby, the rolling rubber rolls 70, the metal-made cylindrical bodies 73 and the cylindrical rubbers 74 are swollen due to the internal pressures in the intra-roll spaces 85, respectively. The external cylinder 40 is correspondingly swollen, and is accordingly crowned variably.

A mechanical sealing member 59 is fitted into the interstice between the center rotary shaft 20 and the work-side end plate 28, whereas a mechanical sealing member 60 is fitted into the interstice between the center rotary shaft 20 and the drive-side end plate 29. In addition, a mechanical sealing member 61 is fitted into the interstice between the work-side end plate 28 and the end-portion rigid member 43, whereas a mechanical sealing member 62 is fitted into the interstice between the drive-side end plate 29 and the end-portion rigid member 44. Furthermore, a mechanical sealing member 86 is fitted into the interstice between the work-side end plate 28 and the supporting shaft 75, whereas a mechanical sealing member 87 is fitted into the interstice between the drive-side end plate 29 and the supporting shaft 76.

By this, the space inside the external cylinder surrounded by the work-side end plate 28, the drive-side end plate 29, the end-portion rigid members 43, 44 and the external cylinder 40 has a fluid-tight structure in which the center rotary shaft 40 penetrates a center area of the space inside the external cylinder (a fluid-tight structure which is configured to be filled with a heating medium such as water or oil). The annular space with the fluid-tight structure between the external cylinder 40 and the center rotary shaft 20 is divided into four pieces in the circumferential direction of the center rotary shaft 20 and the external cylinder 40 by the four rolling rubber rolls 70. A first heating medium chamber 91, a second heating medium chamber 92, a third heating medium chamber 93 and a fourth heating medium chamber 94 are defined between the adjacent twos of the rolling rubber rolls 70 (see FIG. 3).

The heating-medium supplying and discharging mechanism 100 is fixedly disposed in the third heating medium chamber 93. The heating-medium supplying and discharging mechanism 100 includes: a groove-shaped member 101 whose cross-section is shaped like an alphabet V; and an arc-shaped plate member 102 welded to the groove-shaped member 101, and located in a vicinity of the inner peripheral surface of the external cylinder 40. The groove-shaped member 101 and the arc-shaped plate member 102 are provided in such a way as to extend fully in the axial direction of the external cylinder 40. A large number of heating-medium ejection ports 106 are opened throughout the almost entire area of the arc-shaped plate member 102. In other words, a large number of heating-medium ejection ports 106 are provided in such a way as to be distributed in the area almost fully stretching in the axial direction of the external cylinder 40.

The two ends of a connected body including the groove-shaped member 101 and the arc-shaped plate member 102 of each heating-medium supplying and discharging mechanism 100 are fixed to end plates 103, 104. The end plates 103, 104 close the two ends of the connected body including the groove-shaped member 101 and the arc-shaped plate member 102, and thus define a heating-medium supplying chamber 105 of the heating-medium supplying and discharging mechanism 100 in the inside of the connected body.

Each heating-medium supplying and discharging mechanism 100 is provided with a heating-medium supplying and discharging pipe 107. The heating-medium supplying and discharging pipe 107 is fixedly disposed in the inside of the heating-medium supplying chamber 105. The two ends of the heating-medium supplying and discharging pipe 107 jut out of the roll after one end thereof penetrates the end plate 108 and the work-side end plate 28, as well as after the other end thereof penetrates the end plate 109 and the drive-side end plate 29. The heating-medium supplying and discharging pipe 107 is partitioned by a partition plate 110 which is located in the center portion of the heating-medium supplying and discharging pipe 107 in the axial direction. A half of the heating-medium supplying and discharging pipe 107 which is closer to the drive-side end plate 29 constitutes a heating-medium supplying passage 111. The other half of the heating-medium supplying and discharging pipe 107 which is closer to the work-side end plate 28 constitutes a heating-medium discharging passage 112. In addition, an end portion of the heating-medium supplying and discharging pipe 107 which is closer to the drive-side end plate 29 constitutes a heating-medium inlet port 113, whereas the other end portion of the heating-medium supplying and discharging pipe 107 which is closer to the work-side end plate 28 constitutes a heating-medium outlet port 114.

A large number of heating-medium supplying ports 115 opening toward the heating-medium supplying chamber 105 are formed in the heating-medium supplying passage 111 of the heating-medium supplying and discharging pipe 107. A large number of heating-medium discharging ports 116 opening toward the outsides respectively of the groove-shaped member 101 and the heating-medium supplying chamber 105 are formed in the heating-medium discharging passage 112 of the heating-medium supplying and discharging pipe 107.

This structure makes the heating medium flow in the third heating medium chamber 93 in the following sequence. The heating medium enters the heating-medium supplying passage 111 through the heating-medium inlet port 113, and subsequently enters the heating-medium supplying chamber 105 from the heating-medium supplying passage 111 through the heating-medium supplying ports 115. Thereafter, the heating medium is ejected toward the inner peripheral surface of the external cylinder 40 through the heating-medium ejection ports 106, and thus flows outside the heating-medium supplying chamber 105. Afterward, the heating medium enters the heating-medium discharging passage 112 through the heating-medium discharging ports 116, and is thus discharged to the outside of the third heating medium chamber 93 through the heating medium outlet port 114. In other words, the heating medium flows in a heating-medium chamber as the third heating member chamber 93.

Figure 4:
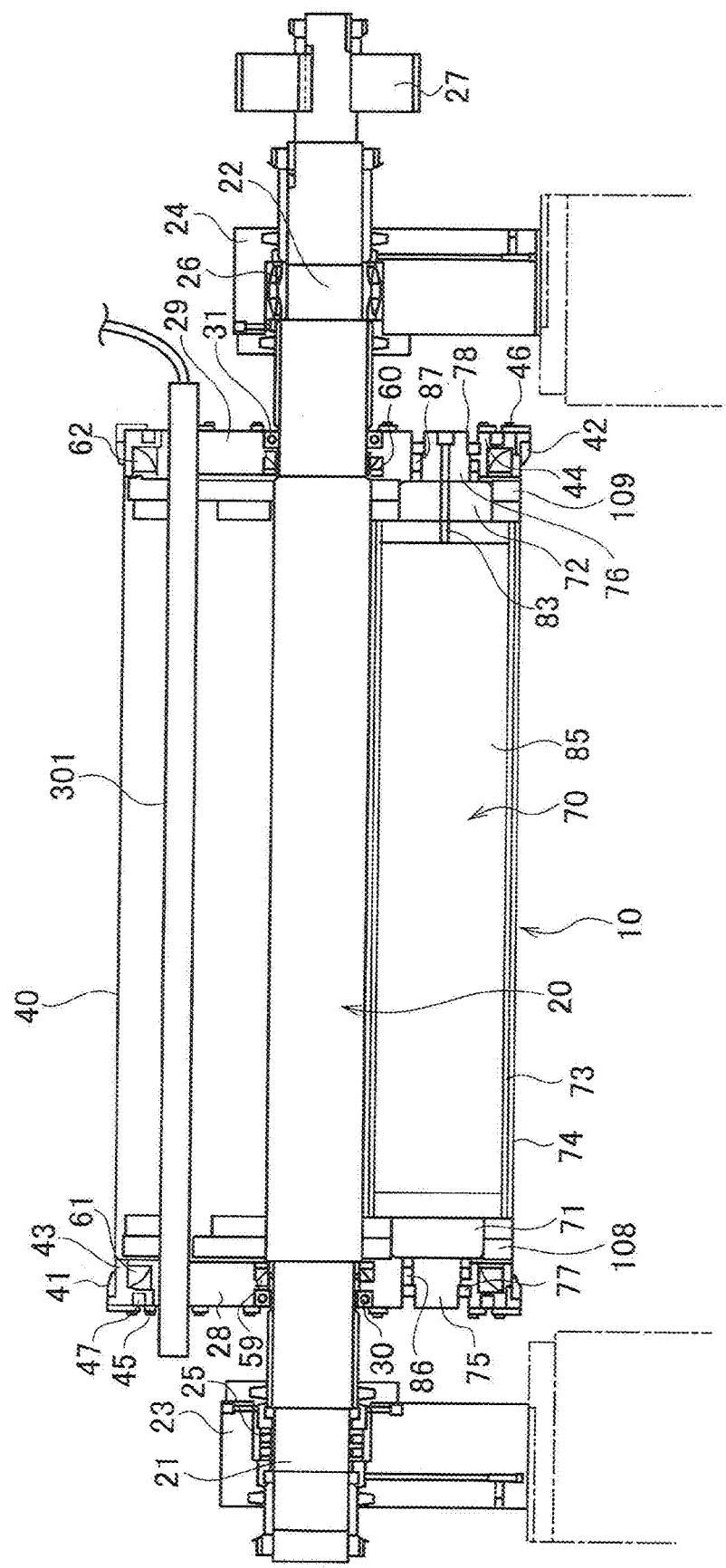
FIG. 4 is another longitudinal sectional view showing the embodiment of the sheet film forming roll according to this invention.

Instead of the heating-medium supplying and discharging mechanism 100, a heater 301 which uses electricity as a heat source is provided to at least one (for example, the heating medium chambers 91, 92) of the heating medium chambers 91 to 94 (see FIGS. 3 and 4). The heater 301 is provided to each of the heating medium chambers 91, 92, for example, in such a way as to extend fully in the heating medium chamber along the axis of the center rotary shaft 20.

The heater 301 which uses electricity as its heat source is configured as an electric heater configured to produce heat due to Joule heat, or as an induction heater configured to produce heat due to electric resistance heating caused by induced current. Otherwise, such a heating medium chamber may be provided with a heater (a steam heater) which uses steam as its heat source instead of, or in addition to, the heater which uses the electricity as its heat source.

As described above, the heating medium chambers 91 to 94 are configured to be filled with the heating medium such as water or oil. The heat emitted by the heater 301 is configured to be transmitted to the external cylinder 40 through the heating medium. The heating medium chambers 91, 92 each provided with the heater 301 are located in the respective places where the sheet film is only heated but not cooled. In other words, the heater 301 is provided to each of the heating medium chambers 91, 92 located adjacent, for example, to a place at which a molten resin of a sheet film shape ejected from a T-die 201 starts to contact a part of the outer periphery having a columnar side surface shape of the sheet film forming roll 10 (see FIG. 6). The place at which the molten resin starts to contact the sheet forming roll 10 will be hereinafter referred to as a "contact starting position 303," and is the same as a location at which the touch roll 211 contacts the sheet forming roll 10.

More detailed descriptions will be provided for the locations of the heating medium chambers 91, 92. Out of the heating medium chambers 91, 92 each provided with the heater 301, the heating medium chamber 91 is located upstream of the contact starting position 303 of the molten resin in the rotational direction of the sheet film forming roll 10, and the heating medium chamber 92 is located downstream of the contact starting position 303 of the molten resin in the rotational direction of the sheet film forming roll 10.

Unlike the heating medium chamber 93 provided with the heating medium supplying and discharging mechanism 100, the heating medium chambers 91, 92 each provided with the heater 301 are formed as almost closed spaces, and almost no heating medium goes in or out of each of the heating medium chambers 91, 92. The heating medium chambers 91, 92 provided with their heaters 301 are each configured to be filled with the heating medium, for example, by the heating medium supplying and discharging mechanism 100. Specifically, part of the heating medium supplied to the heating medium chamber 93 by the heating medium supplying and discharging mechanism 100 enters the heating medium chambers 91, 92 provided with their heaters 301 through very minute gaps between the inner peripheral surface of the external cylinder 40 and their rubber rolls 70. Thereby, the heating medium chambers 91, 92 are each filled with the heating medium.

In addition, the heating medium chambers 91, 92 provided with their heaters 301 include air bleeding mechanisms (for example, air bleeding valves; not illustrated) each for making it easy to bleed the heating medium chamber of excessive air, and to fill the heating medium chamber with the heating medium. The air bleeding valves are provided to upper portions of the heating medium chambers 91, 92, respectively. The upper portions thereof are located, for example, on the end plate 28.

Furthermore, the heaters 301 are located in lower portions of the heating medium chambers 91, 92, respectively. The heaters 301 are configured to evenly heat the entire heating medium chambers 91, 92 provided with their heaters 301.

The heating medium chamber 91 provided with the heater 301 includes a temperature sensor 305 configured to sense the temperature of the heating medium filled in this heating medium chamber 91. Similarly, the heating medium chamber 92 includes its own temperature sensor 305.

Depending on the temperatures of the heating media sensed by the sensors 305, a controller (not illustrated) is configured to control the amount of heat emitted from the heaters 301 in order that the temperatures of the heating media filled in the heating medium chambers 91, 92 provided with their heaters 301 should be equal to desired values, respectively.

Out of the heating medium chambers 91 to 94, as described above, only the heating medium chambers 91, 92 are provided with their heaters 301, and only the heating media filled in the heating medium chambers 91, 92 are configured to be heated by the heaters 301. This configuration can reduce the number of pipes through which the heating medium are supplied to and discharged from the heating medium chambers. This reduction accordingly can simplify the overall configuration of the apparatus. This simplification makes it easy to assemble and maintain the apparatus.

Moreover, as described above, although the minute gaps are formed between the inner peripheral surface of the external cylinder 40 and the rubber rolls 70, the heating medium chambers 91, 92 are formed as the almost closed spaces. For this reason, it is possible to reduce the amount of heating medium moving between (leaking from) the heating medium chambers 91 to 94 to a minimum in spite of the presence of the gaps. This reduction makes it possible to set the temperatures of the respective heating medium chambers 91 to 94 adequately.

Figure 6:
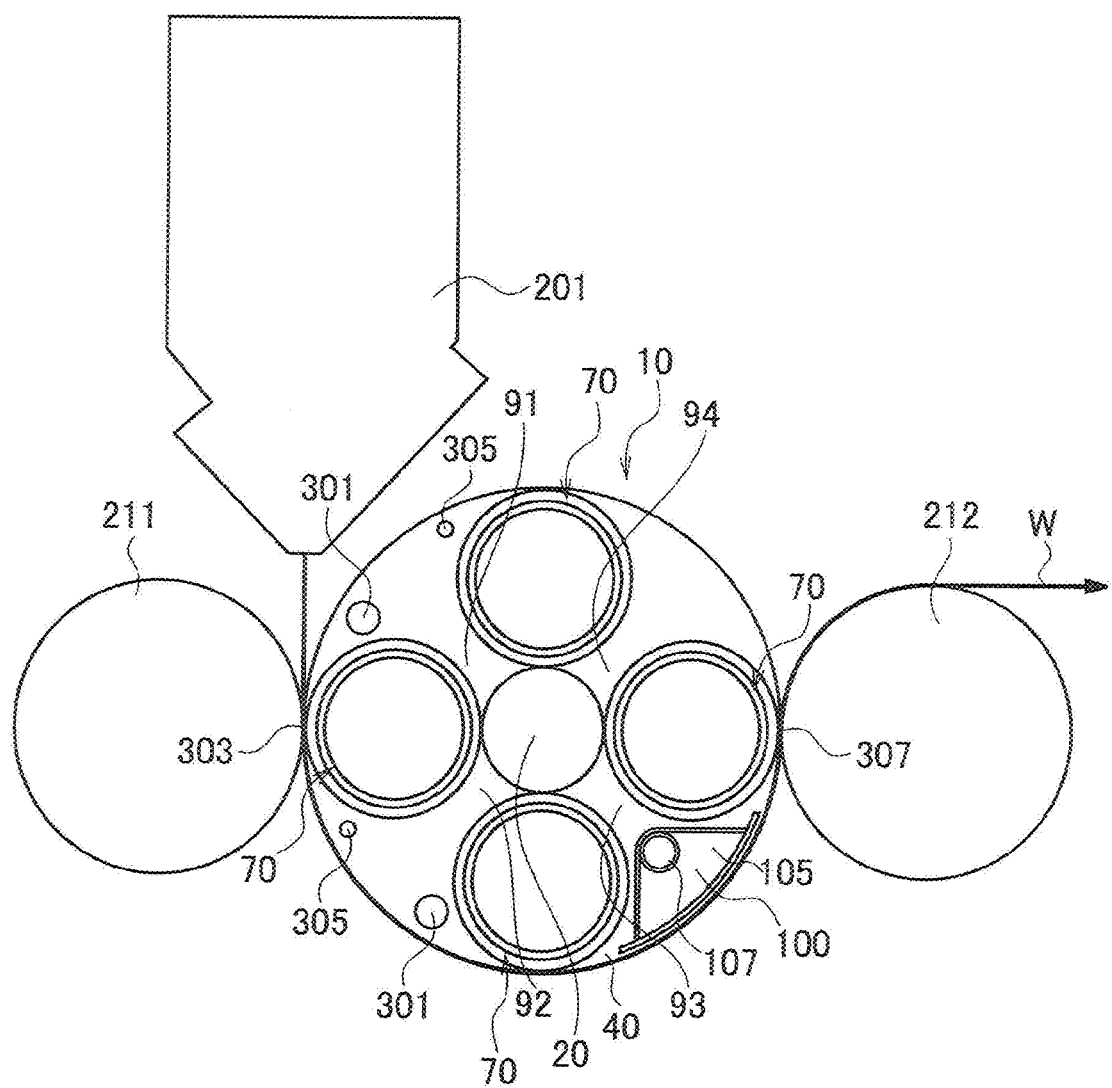
FIG. 6 is a diagram showing an embodiment of a touch-roll type of sheet film casting apparatus to which the sheet film forming roll according to the present embodiment is applied as its main roll.

Out of the heating medium chambers 91 to 94, only the heating medium chamber 93 provided with no heater 301 is configured in order that the temperature of the heating medium filled in the heating medium chamber 93 should be adjusted by a temperature adjuster (for example, in order that the heating medium filled in the heating medium chamber 93 should be cooled by a cooler) (see FIGS. 3 and 6).

The multiple heating medium chambers 93, 94 are provided with no heater 301. However, all the heating medium chambers provided with no heater 301 do not have to be cooled by their respective coolers. At least one of the heating medium chambers provided with no heater 301 may be cooled by its cooler. In other words, the heating medium supplying and discharging mechanism 100 indicated by the long dashed double-short dashed lines in FIG. 3 (the heating medium supplying and discharging mechanism 100 located in the heating medium chamber 94) may be provided there, or may not be provided there.

The heating medium chamber 94 provided neither the heater 301 nor the cooler is formed as a closed space like the heating medium chambers 91, 92 provided with their heaters 301. In addition, the heating medium chamber 94 provided with neither the heater 301 or the cooler is configured to be filled with the heating medium in the same manner as the heating medium chambers 91, 92 provided with their heaters 301 is filled with the heating medium.

The heating medium chamber 93 configured in order that the lo heating medium filled in the heating medium chamber 93 should be cooled by the cooler is situated in a location where the sheet film needs to be cooled. In other words, the heating medium filled in the heating medium chamber 93 adjacent to a place at which a resin in contact with a part of the outer periphery having a columnar side surface shape of the sheet film forming roll 10 is separated from the sheet film forming roll is configured to be cooled by the cooler. In this respect, the place at which the resin is separated from the sheet film forming roll is referred to as a "separation position" 307.

More detailed descriptions will be provided for the location of the heating medium chamber 93. The heating medium chamber 93 filled with the heating medium configured to be cooled by the cooler is located upstream of the separation position 307 of the molten resin in the rotational direction of the sheet film forming roll. Note that the heating medium chamber 94 located downstream of the separation position 307 of the molten resin is not provided with the heater 301, or not configured to be cooled by the cooler. The heating medium chamber 94 is merely filled with the heating medium.

The heating medium supplying and discharging mechanism 100 is used as the cooler (adjuster), for example. In this case, the heating medium supplied to and discharged from the heating medium chamber by the heating medium supplying and discharging mechanism 100 is configured to be cooled (adjusted in temperature) by a cooling unit (temperature adjusting unit) located outside the sheer film forming roller.

Otherwise, the heating medium chamber may include a heat exchanger (a heat exchanger configured to cool the heating medium filled in the heating medium chamber) as the cooler (adjuster). In this case, a medium to flow in the heat exchanger is configured to be used, for example, in a way that the medium is circulated in the heat exchanger while cooled by a cooling unit.

As described above, when the temperature of the heating medium is set for each of the first to fourth heating medium chambers 91 to 94, respectively, the surface temperature of the external cylinder 40 can be set for each of belt-shaped zones corresponding to the first to fourth heating medium chambers 91 to 94. In other words, the surface temperature of the external cylinder 40 can be set for each of the first to fourth heating medium chambers 91 to 94 defined as the temperature controlling zones in the rotational direction of the roll.

As already understood, the first to fourth heating medium chambers 91 to 94 are separated from one another by the rolling rubber rolls 70 which are in contact with both the center rotary shaft 20 and the external cylinder 40 with the cylindrical rubbers 74 interposed in between. This scheme offers the sealing effect to each of the first to fourth heating medium chambers 91 to 94. Thereby, no portion of the heating medium leaks from or to the first to fourth heating medium chambers 91 to 94. Otherwise, it is possible to avoid the leakage of the heating medium from or to the first to fourth heating medium chambers 91 to 94 to a maximum extent.

This makes it possible to set the temperatures of the temperature controlling zones obtained respectively for the first to fourth heating medium chambers 91 to 94 precisely and adequately, and accordingly makes it possible to set the surface temperature of the external cylinder 40 for each temperature controlling zones precisely and adequately.

Moreover, in the heating medium chamber 93, the heating medium whose temperature is controlled is ejected to the inner peripheral surface of the external cylinder 40 from the large number of heating-medium ejection holes 106 made in the almost entire area of the arc-shaped plate member 102 fully stretching in the axial direction of the external cylinder 40. This ejection scheme in combination with the heaters 301 makes it possible to set the surface temperature of the external cylinder 40 almost evenly in each of the temperature controlling zones corresponding to the first to fourth heating medium chambers 91 to 94.

This evens out the surface temperature of the external cylinder 40 in each temperature controlling zone without allowing a temperature gradient in the axial direction of the roll to occur in each temperature controlling zone.

In order to clearly vary the surface temperature of the external cylinder 40 from one temperature controlling zone to another in the sheet film forming roll 10 in rotation, the external cylinder 40 is formed with the thinner structure which makes the heat capacity of the external cylinder 40 smaller. Nevertheless, the external cylinder 40 is backed up with the rolling rubber rolls 70 as if backed up with steel liners. For this reason, when a sheet film is cast by use of touch rolls, or when a fine pattern is transferred onto a sheet film, it is possible for each touch roll to press the external cylinder 40 with a fully-secured pressing force, although the external cylinder 40 is thinner in thickness. That is because, if places at which the touch rolls should be located correspond to places at which counterpart rolling rubber rolls 70 of the touch rolls which are situated, the rolling rubber rolls 70 prevents the external cylinder 40 from being deformed.

Thereby, it is possible to vary the surface temperature of the external cylinder 40 of the sheet film forming roll 10 in rotation among the temperature controlling zones defined in the roll circumferential direction, when the sheet film is cast by use of the touch rolls, or when the fine pattern is transferred onto the sheet film.

FIG. 6 shows an embodiment of a touch-roll type of sheet film casting apparatus to which the sheet film forming roll 10 according to the foregoing embodiment is applied as its main roll.

In the case of the sheet film casting apparatus according to the present embodiment, touch rolls 211, 212 are provided corresponding to two horizontally-arranged rolling rubber rolls 70 whose rotational phase positions are different from each other by 180 degrees with respect to the center axis of the sheet film forming roll 10, that is, at locations which make the touch rolls 211, 212 correspond to the two rubber rolls 70 horizontally arranged in the sheet film forming roll 10, respectively.

The molten thermoplastic resin from the T-die 201 is supplied to the interstice of the sheet film forming roll 10 and the touch roll 211 in the downward direction, and is thus sandwiched between the sheet film forming roll 10 and the touch roll 211.

In this case, as already understood, a part of the place where the touch roll 211 is disposed is the contact starting position 303 at which the thermoplastic resin starts to contact the sheet film forming roll 10. This contact starting position 303 is situated at a boundary between the first heating medium chamber 91 and the second heating medium chamber 92. A part of the place where the touch roll 212 is disposed is the separation position 307 at which the thermoplastic resin is separated from the sheet film forming roll 10. This separation position 307 is situated at a boundary between the third heating medium chamber 93 and the fourth heating medium chamber 94.

In conjunction with the rotation of the sheet film forming roll 10, the thermoplastic resin moves from the contact starting position 303 to the separation position 307 while being in contact with the roll surface of the sheet film forming roll 10. While moving from the contact starting position 303 to the separation position 303, the thermoplastic resin sequentially passes the temperature controlling zone of the second heating medium chamber 92, and the temperature controlling zone of the third heating medium chamber 93. Thereby, the thermoplastic resin is cooled and thus hardened.

With regard to the temperature management of the sheet film forming roll 10 according to the present embodiment, the temperature of the heating medium is set the highest in the first heating medium chamber 91 among the first to fourth heating medium chambers 91 to 94. The temperature of the heating medium is set in such a way as to become gradually lower toward the second heating medium chamber 92 and the third heating medium chamber 93. The temperature of the heating medium in the heating medium supplying chamber 105 in the fourth heating chamber 94 is set slightly higher than the temperature of the heating medium in the third heating medium chamber 93.

With regard to the surface temperature of the external cylinder 40, the temperatures of the temperature controlling zones obtained in the first to fourth heating medium chambers 91 to 94 are almost equal to the temperatures of the heating mediums of the first to fourth heating medium chambers 91 to 94.

The surface temperature of the touch roll 211 is controlled in order that the surface temperature thereof should be almost equal to the surface temperature of the external cylinder 40 in the temperature controlling zone of the second heating medium chamber 92. The surface temperature of the touch 212 is controlled in order that the surface temperature thereof should be almost equal to the surface temperature of the external cylinder 40 in the temperature controlling zone of the third heating medium chamber 93.

Let us assume that the temperature of the molten resin flowing out of the T-die 201 is 270° C., for example. In this case, the temperature of the heating medium in the first heating medium chamber 91 is set at 160° C. The temperature of the heating medium in the second heating medium chamber 92 is set at 130° C. The temperature of the heating medium in the third heating medium chamber 93 is set at 80° C. The temperature of the heating medium in the fourth heating medium chamber 94 is set at approximately 100° C.

By this, the roll surface temperature of the sheet film forming roll 10 at the contact starting position 303 where the molten resin having flowed out of the T-die 201 starts to contact the sheet film forming roll 10 is set rather high compared with the case where a sheet film forming roll whose surface temperature does not differ in the roll circumferential direction is used as the main roll. This can make the resin and the roll surface (the surface of the external cylinder 40) in fully-secured contact with each other.

In addition, the roll surface temperature of the sheet film forming roll 10 in the vicinity of the separation position 307 where the cast resin (sheet film W) is separated from the sheet film forming roll 10 is set rather low compared with the case where a sheet film forming roll whose surface temperature does not differ in the roll circumferential direction is used as the main roll. This makes it possible to cause the resin to quickly pass the roll surface whose temperature is close to the crystallizing temperature while securing the surface quality of the resin, and accordingly to separate the resultant resin from the roll surface smoothly. These enable the sheet film W to be cast with a higher quality.

Figure 7:
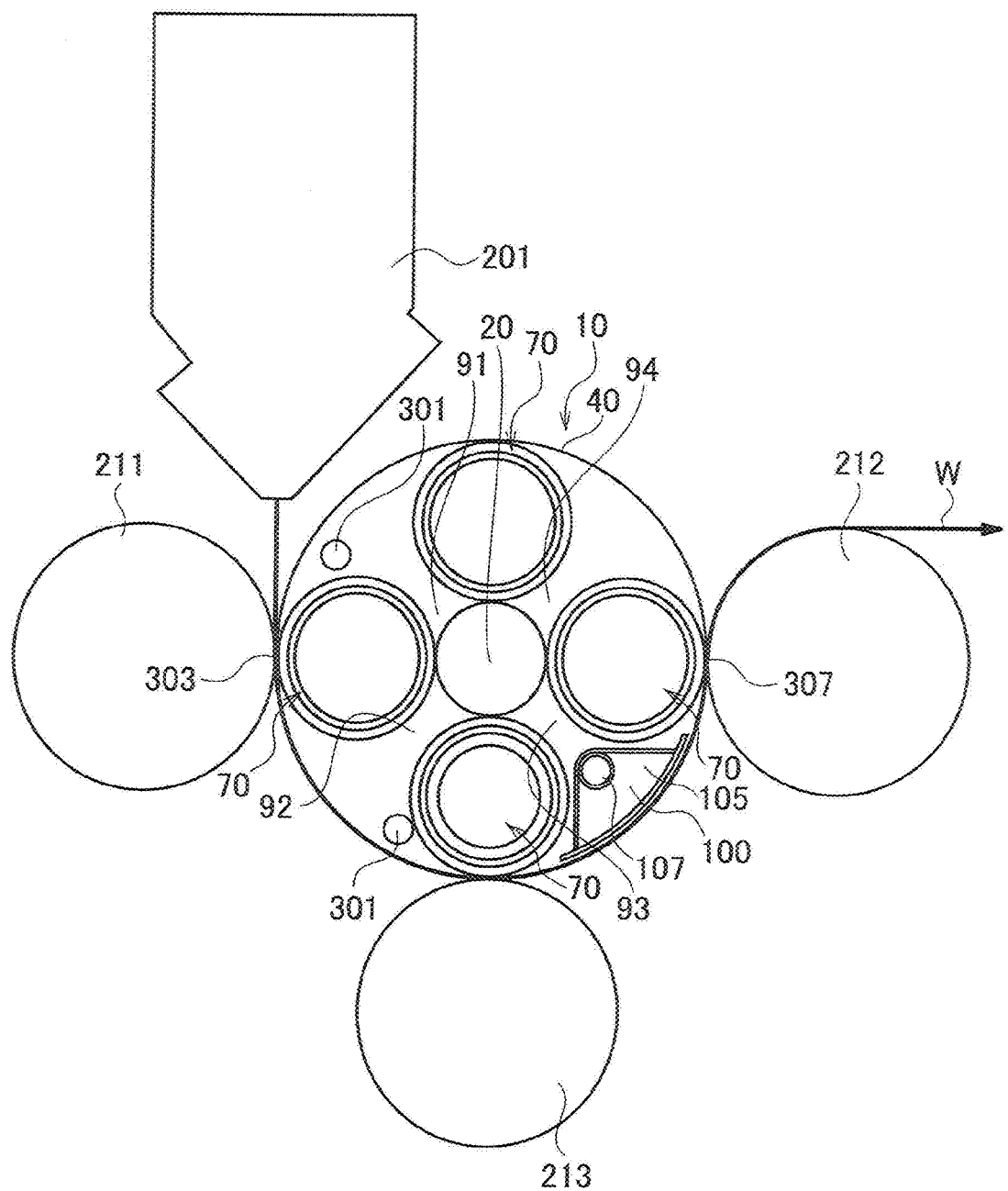
FIG. 7 is a diagram showing another embodiment of the touch-roll type of sheet film casting apparatus to which the sheet film forming roll according to the present embodiment is applied as its main roll.

FIG. 7 shows another embodiment of the touch-roll type of sheet film casting apparatus, which has another touch roll 213 in a place corresponding to a rolling rubber roll 70 located at the boundary between the second heating medium chamber 92 and the third heating medium chamber 93 in addition to the touch rolls 211, 212. The rest of the configuration of the touch-roll type of sheet film casting apparatus according to the present embodiment is almost the same as the configuration of the touch-roll type of sheet film casting apparatus to which the sheet film forming roll 10 according to the foregoing embodiment is applied as its main roll.

In this case, the roll surface temperature of the sheet film forming roll 10 and the roll surface temperature of the touch roll 211 at the contact starting position 303 may be respectively equal to those according to the foregoing embodiment shown in FIG. 6. The roll surface temperature of the touch roll 213 is set almost equal to the surface temperature of the external cylinder 40 in the temperature controlling zone of the third heating medium chamber 93. The roll surface temperature of the touch roll 212 at the separation position 307 is set lower than the surface temperature of the external cylinder 40 in the temperature controlling zone in the third heating medium chamber 93. For example, when the temperature of the heating medium supplied to the heating medium supplying chamber 05 in the third heating medium chamber 93 is 80° C., the roll surface temperature of the touch roll 212 is set at approximately 40° C. This decreases the temperature of the resin separated from the sheet film forming roll 10, and accordingly cools the resin while the resin is being cast. This enables the resin to be separated from the roll surface more smoothly.

Figure 8:
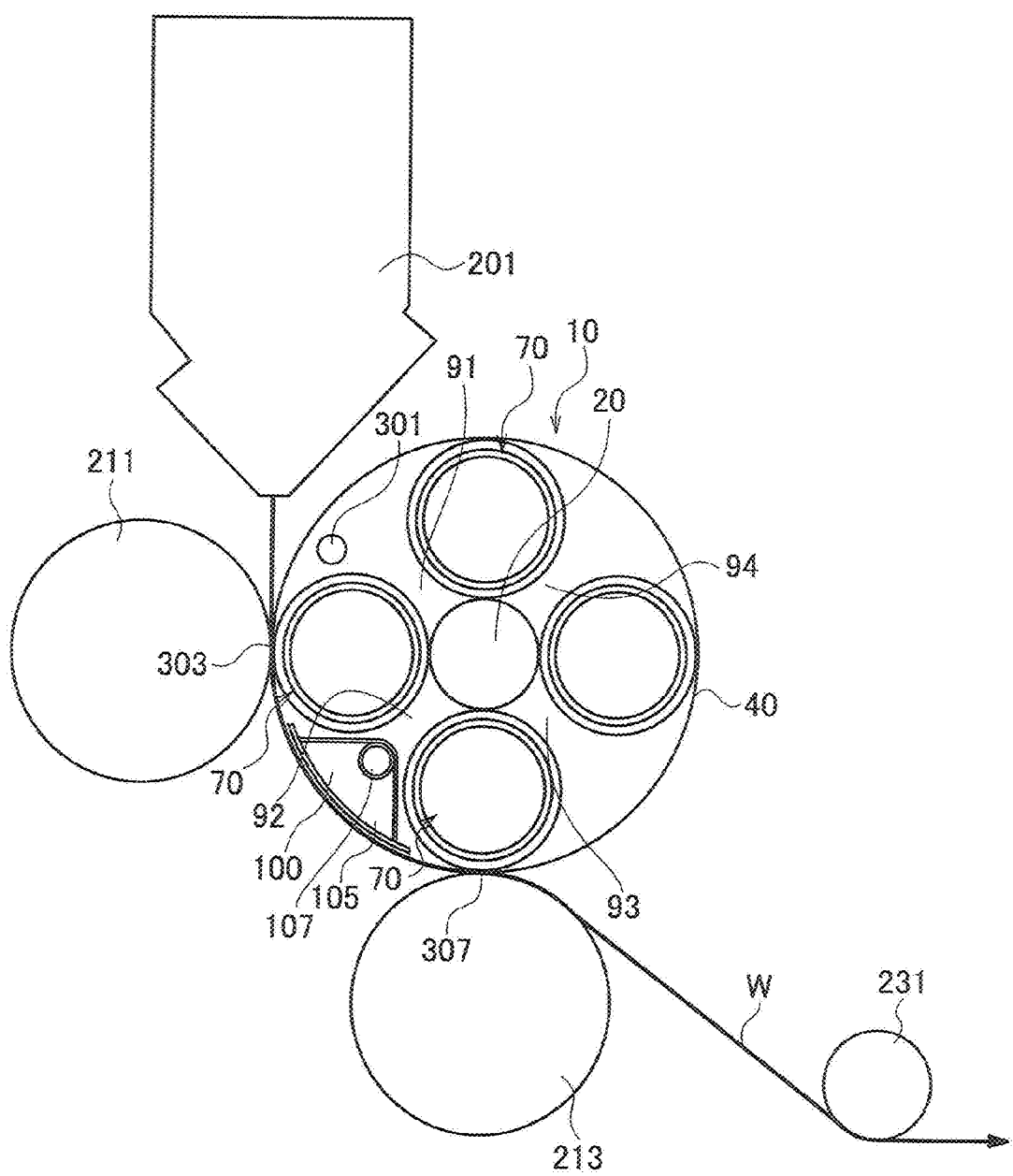
FIG. 8 is a diagram showing yet another embodiment of the touch-roll type of sheet film casting apparatus to which the sheet film forming roll according to the present embodiment is applied as its main roll.

FIG. 8 shows yet another embodiment of the touch-roll type of sheet film casting apparatus to which the sheet film forming roll 10 according to the foregoing embodiment is applied as its main roll. In this embodiment, the touch rolls 211, 213 are provided corresponding to two horizontally-arranged rolling rubber rolls 70 whose rotational phase positions are different from each other by 90 degrees with respect to the center axis of the sheet film forming roll 10.

In this case, the contact staring position 303 is the same as that in the touch-roll type of sheet film casting apparatus according to the foregoing embodiment. On the contrary, a part of the place where the touch roll is disposed is a position at which the thermoplastic resin is separated from the sheet film forming roll 10. This separation position 307 is situated at the boundary between the second heating medium chamber 92 and the third heating medium chamber 93. In addition, the heater 301 is provided in the heating medium chamber 91, whereas the heating medium supplying and discharging mechanism 100 is provided in the heating medium chamber 92.

With regard to the temperature management of the sheet film forming roll 10 according to the present embodiment, the temperature of the heating medium supplied to the heating medium supplying chamber 105 is set the highest in the first heating medium chamber 91 among the first to fourth heating medium chambers 94. The temperature of the heating medium supplied to the heating medium supplying chamber 105 is set in such a way as to become gradually lower toward the second heating medium chamber 92 and the third heating medium chamber 93. The temperature of each of the third heating medium chamber 93 and the fourth heating medium chamber 94 in particular is not managed.

For example, when the temperature of the molten resin flowing out of the T-die 201 is 270° C., the temperature of the heating medium supplied to the heating medium chamber 105 in the first heating medium chamber 91 is set at 130° C.; the temperature of the heating medium supplied to the heating medium chamber 105 in the second heating medium chamber 92 is set at 90° C.; the temperature of the heating medium supplied to the heating medium chamber 105 in the third heating medium chamber 93 is set at 40° C.; the roll surface temperature of the touch roll 211 is set at 90° C.; and the roll surface temperature of the touch roll 213 is set at approximately 40° C.

The resin is cooled more quickly in the present embodiment than in the foregoing embodiment. For this reason, the present embodiment is suitable for casting a sheet film made of a thermoplastic resin suitable for quick cooling.

The sheet film W separated from the sheet film forming roll 10 is guided by a guiding roller 213, and is thus moved to the ensuing step.

Figure 9:
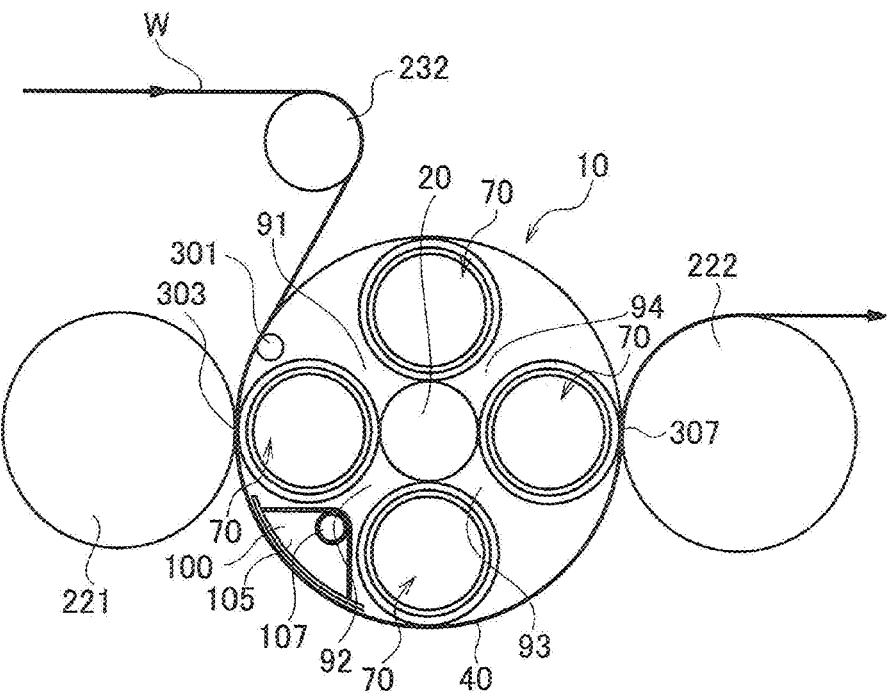
FIG. 9 is a diagram showing an embodiment of a fine pattern transferring apparatus to which the sheet film forming roll according to the present embodiment is applied as its main roll.

FIG. 9 shows an embodiment of a fine pattern transferring apparatus to which the sheet film forming roll 10 according to the foregoing embodiment is applied as its main roll.

The fine pattern transferring apparatus transfers and thus forms a fine pattern of an emboss or the like onto a surface of a reheated sheet film W made a thermoplastic resin. To this end, a fine pattern as a reverse model for the fine pattern to be transferred onto the sheet film W is formed on the surface of the external cylinder 40 of the sheet film forming roll 10 used for the fine pattern transferring apparatus.

In the case of the fine pattern transferring apparatus according to the present embodiment, touch rolls 221, 222 are provided corresponding to two horizontally-arranged rolling rubber rolls 70 whose rotational phase positions are different from each other by 180 degrees with respect to the center axis of the sheet film forming roll 10, that is, in locations which make the touch rolls 221, 222 correspond to the two rubber rolls 70 horizontally arranged in the sheet film forming roll 10, respectively.

The sheet film W is guided by a guide roll 232, and is thus sent to the roll surface of the sheet film forming roll 10. Thereafter, the sheet film W is sent in such a way as to be wound around a part of the roll surface of the sheet film forming roll 10. The fine pattern is transferred onto the sheet film W at a part of the place at which the touch roll 221 is disposed. This transfer starting position 303 is located at a boundary between the first heating medium chamber 91 and the second heating medium chamber 92. A part of the place at which the touch roll 222 is disposed is a separation position 307 at which the thermoplastic resin is separated from the sheet film forming roll 10. This separation position 307 is located at a boundary between the third heating medium chamber 93 and the fourth heating medium chamber 94.

In the present embodiment, the first heating medium chamber 91 is provided with the heater 301, and the second heating medium chamber 92 is provided with the heating medium supplying and discharging mechanism 100. However, the second heating medium chamber 92 may be provided with the heater 301 instead of the heating medium supplying and discharging mechanism 100; and the third heating medium chamber 93 may be provided with the heating medium supplying and discharging mechanism 100. Furthermore, with regard to the temperature management of the sheet film forming roll 10, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. The temperature of the heating medium supplied to the heating medium supplying chamber 105 is set slightly higher in the fourth heating medium chamber 94 than in the third heating medium chamber 93.

With regard to the surface temperature of the external cylinder 40, the temperatures of the temperature controlling zones obtained in the first to fourth heating medium chambers 91 to 94 are almost equal to the temperatures of the heating mediums supplied to the heating medium supplying chambers 105 in the first to fourth heating medium chambers 91 to 94, respectively.

The surface temperature of the touch roll 221 is controlled in order that the surface temperature thereof should be almost equal to the surface temperature of the external cylinder 40 in the temperature controlling zone of the second heating medium chamber 92. The surface temperature of the touch roll 222 is controlled in order that the surface temperature thereof should be almost equal to the surface temperature of the external cylinder 40 in the temperature controlling zone of the third heating medium chamber 93.

For example, the temperature of the heating medium supplied to the heating medium supplying chamber 105 in the first heating medium chamber 91 is set at 160° C.; the temperature of the heating medium supplied to the heating medium supplying chamber 105 in the second heating medium chamber 92 is set at 130° C.; the temperature of the heating medium supplied to the heating medium supplying chamber 105 in the third heating medium chamber 93 is set at 80° C.; and the temperature of the heating medium supplied to the heating medium supplying chamber 105 in the fourth heating medium chamber 94 is set at approximately 100° C.

By this, the sheet film W having been sent to the roll surface of the sheet film forming roll 10 under the guidance of the guide roll 232 is pre-heated by the temperature controlling zone in the first heating medium chamber 91 which is set at the highest temperature while moving from the contact starting position to the transfer starting position on the roll surface of the sheet film forming roll 10. As a result of pre-heating the sheet film W in this manner, the temperature of the sheet film W at the transfer starting position becomes equal to or higher than the glass transition temperature. At the transfer starting position, the sheet film W is pressed against the roll surface of the sheet film forming roll 10 by the touch roll 221, and the fine pattern formed on the roll surface is transferred to the sheet film W. Thereafter, the resultant sheet film W moves to the separation position in accordance with the rotation of the sheet film forming roll 10 while wound around the part of the roll surface of the sheet film forming roll 10. During this movement, the sheet film W sequentially passes the temperature controlling zone in the second heating medium chamber 92 and the temperature controlling zone in the third heating medium chamber 93. Thereby, the sheet film W is cooled to a temperature equal to or lower than the glass transition temperature.

By this, the roll surface temperature of the sheet film forming roll 10 before the transfer starting position, or the temperature of the temperature controlling zone which is set the highest by the first heating medium chamber 91 configured to pre-heat the sheet film W, can be set rather high compared with the case where a main roll whose surface temperature does not differ in the roll circumferential direction is used for the fine pattern transferring apparatus. This makes it possible to fully raise the temperature of the sheet film W to the temperature equal to or higher than the glass transition temperature. This temperature raise enables the fine pattern to be transferred to the sheet film W with full precision.

The roll surface temperature near the separation position 307 where the sheet film W onto which the fine pattern has been transferred is separated from the sheet film forming roll 10 can be set rather low compared with the case where the main roll whose surface temperature does not differ in the roll circumferential direction is used for the fine pattern transferring apparatus. This makes it possible to fully cool the sheet film W. This full cooling enables the sheet film W to be separated from the roll surface after the fine pattern having been transferred to the sheet film W is fully hardened and thus fixed to the sheet film W. Consequently, the sheet film forming roll 10 used as the main roll thereof can transfer the fine pattern onto the sheet film W securely and precisely, and accordingly can offer the sheet film W onto which the fine pattern is transferred with high quality.

Figure 10:
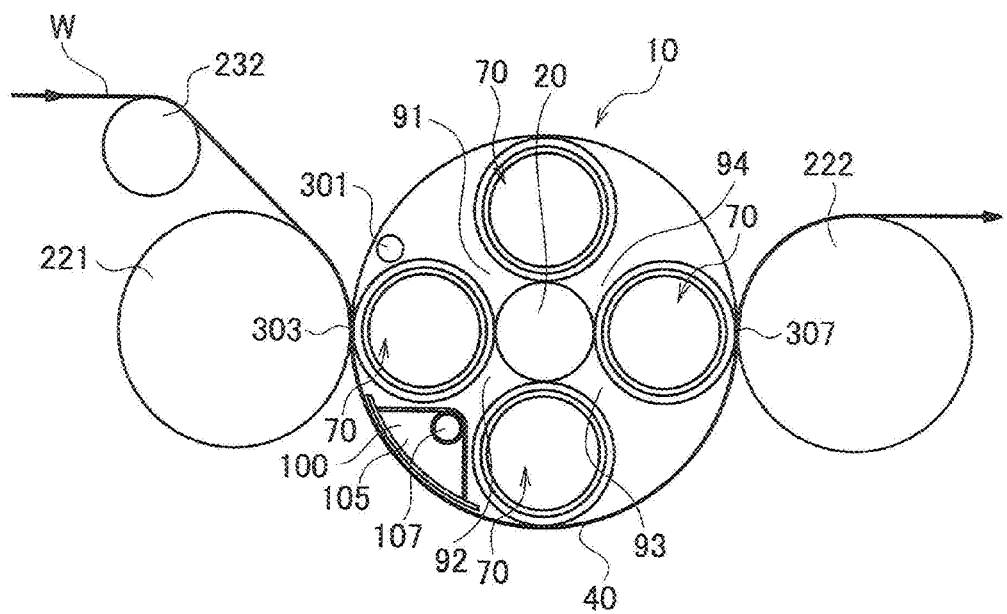
FIG. 10 is a diagram showing another embodiment of the fine pattern transferring apparatus to which the sheet film forming roll according to the present embodiment is applied as its main roll.

FIG. 10 shows another embodiment of the fine pattern transferring apparatus to which the sheet film forming roll 10 according to the foregoing embodiment is applied as its main roll. In the present embodiment, the first heating medium chamber 91 is provided with the heater 301, and the second heating medium chamber 92 is provided with the heating medium supplying and discharging mechanism 100. Instead, however, the second heating medium chamber 92 may be provided with the heater 301, and the third heating medium chamber 93 may be provided with the heating medium supplying and discharging mechanism 100.

In this embodiment, the sheet film W is guided by the guide roll 232, and is thus sent to the transfer starting position at which the touch roll 221 starts to transfer the fine pattern onto the sheet film W. This embodiment is suitable for transferring the fine pattern onto the sheet film W through a step substantially not requiring the sheet film W to be pre-heated, and for transferring the fine pattern onto a thermoplastic resin whose glass transition temperature is lower.

Figure 11:
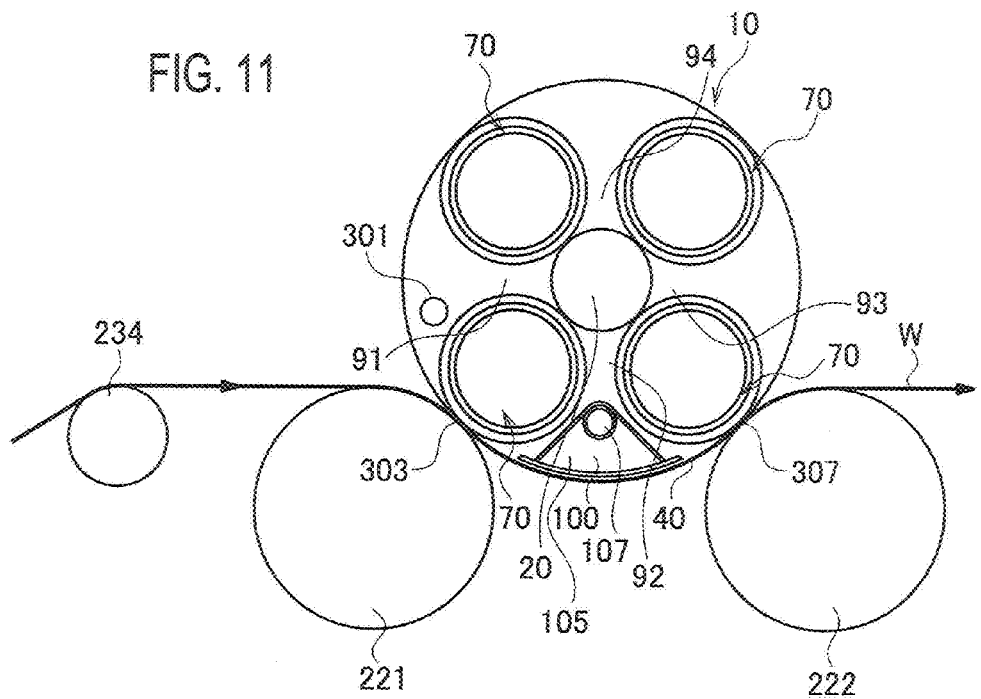
FIG. 11 is a diagram showing yet another embodiment of the fine pattern transferring apparatus to which the sheet film forming roll according to the present embodiment is applied as its main roll.

FIG. 11 shows yet another embodiment of the fine pattern transferring apparatus to which the sheet film forming roll 10 according to the foregoing embodiment is applied as its main roll.

In this embodiment, the touch rolls 221, 222 are provided corresponding to two rolling rubber rolls 70 whose rotational phase positions are different from each other by 90 degrees with respect to the center axis of the sheet film forming roll 10. In addition, the first heating medium chamber 91 is provided with the heater 301, and the second heating medium chamber 92 is provided with the heating medium supplying and discharging mechanism 100.

The sheet film W is guided by the guide roll 234, and is thus sent to the transfer starting position. The sheet film W is separated from the sheet film forming roll 10 by the touch roll 222 at the separation position. The transfer starting position is located at a boundary between the first heating medium chamber 91 and the second heating medium chamber 92. The separation position is located at a boundary between the second heating medium chamber 92 and the third heating medium chamber 93.

In the present embodiment, as well, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the second heating medium chamber 92 and the third heating medium chamber 93. In addition, the temperature of the heating medium supplied to the heating medium supplying chamber 105 in the fourth heating medium chamber 94 is set slightly higher than the temperature of the heating medium supplied to the heating medium supplying chamber 105 in the third heating medium chamber 94. In addition, the surface temperature of the touch roll 221 is controlled in order to be almost equal to the surface temperature of the external cylinder 40 in the temperature controlling zone of the second heating medium chamber 92. The surface temperature of the touch roll 222 is controlled in order to be almost equal to the surface temperature of the external cylinder 40 in the temperature controlling zone of the third heating medium chamber 93.

This embodiment is suitable for transferring a fine pattern onto a sheet film at a high speed through a step substantially not requiring the sheet film to be pre-heated.

Figure 12:
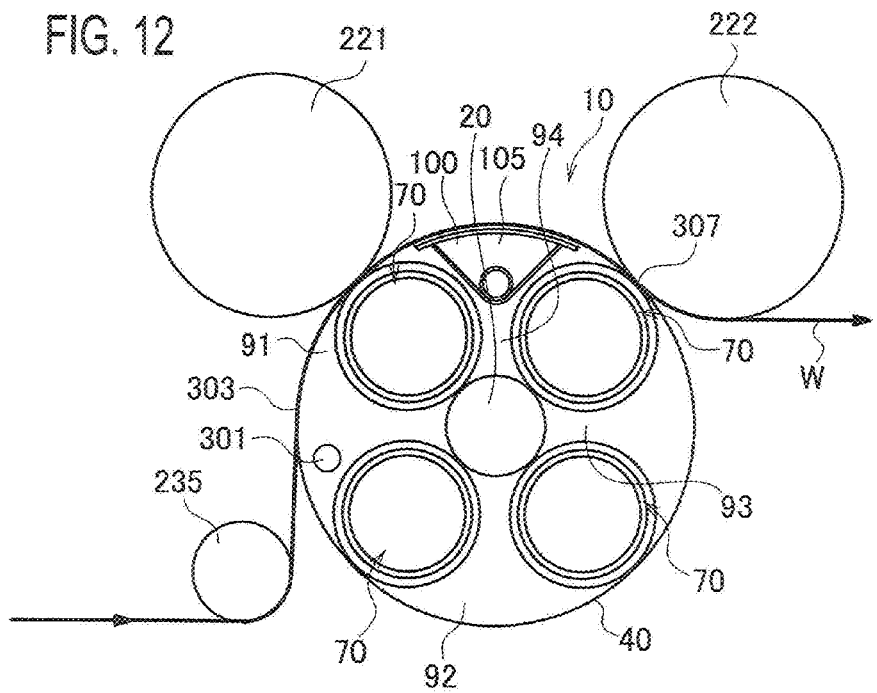
FIG. 12 is a diagram showing still another embodiment of the fine pattern transferring apparatus to which the sheet film forming roll according to the present embodiment is applied as its main roll.

FIG. 12 shows still another embodiment of the fine pattern transferring apparatus to which the sheet film forming roll 10 according to the foregoing embodiment is applied as its main roll.

Unlike the sheet film forming roll 10 applied to the fine pattern transferring apparatus according to the foregoing embodiment, the sheet film forming roll 10 applied to the fine pattern transferring apparatus according to the present embodiment rotates in the counterclockwise direction. The touch rolls 221, 222 are provided corresponding to two rolling rubber rolls 70 whose rotational phase positions are different from each other by 90 degrees with respect to the center axis of the sheet film forming roll 10. In addition, the first heating medium chamber 91 is provided with the heater 301, and the fourth heating medium chamber 94 is provided with the heating medium supplying and discharging mechanism 100.

The sheet film W is guided by a guide roll 235, and is thus sent to the roll surface of the sheet film forming roll 10. Thereafter, the sheet film W is sent in such a way as to be wound around a part of the roll surface of the sheet film forming roll 10. A part of the place at which the touch roll 221 is disposed is a transfer starting position. This transfer starting position is located at a boundary between the first heating medium chamber 91 and the fourth heating medium chamber 94. A part of the place at which the touch roll 222 is disposed is a separation position at which the thermoplastic resin is separated from the sheet film forming roll 10. This separation position is located at a boundary between the fourth heating medium chamber 94 and the third heating medium chamber 93.

With regard to the temperature management of the sheet film forming roll 10 for this embodiment, the temperature of the heating medium supplied to the heating medium supplying chamber 105 is set the highest in the first heating medium chamber 91 among the first to fourth heating medium chambers 91 to 94. The temperature of the heating medium supplied to the heating medium supplying chamber 105 is set in such a way as to become gradually lower toward the fourth heating medium chamber 94 and the third heating medium chamber 93. The temperature of the heating medium supplied to the heating medium supplying chamber 105 in the second heating medium chamber 92 is set slightly higher than the temperature of the heating medium supplied to the heating medium supplying chamber 105 in the third heating medium chamber 93. In addition, the surface temperature of the touch roll 221 is controlled in order to be almost equal to the surface temperature of the external cylinder 40 in the temperature controlling zone of the fourth heating medium chamber 94. The surface temperature of the touch roll 222 is controlled in order to be almost equal to the surface temperature of the external cylinder 40 in the temperature controlling zone of the third heating medium chamber 93.

This embodiment brings about the same operation and effect as the embodiment shown in FIG. 9.

Figure 13:
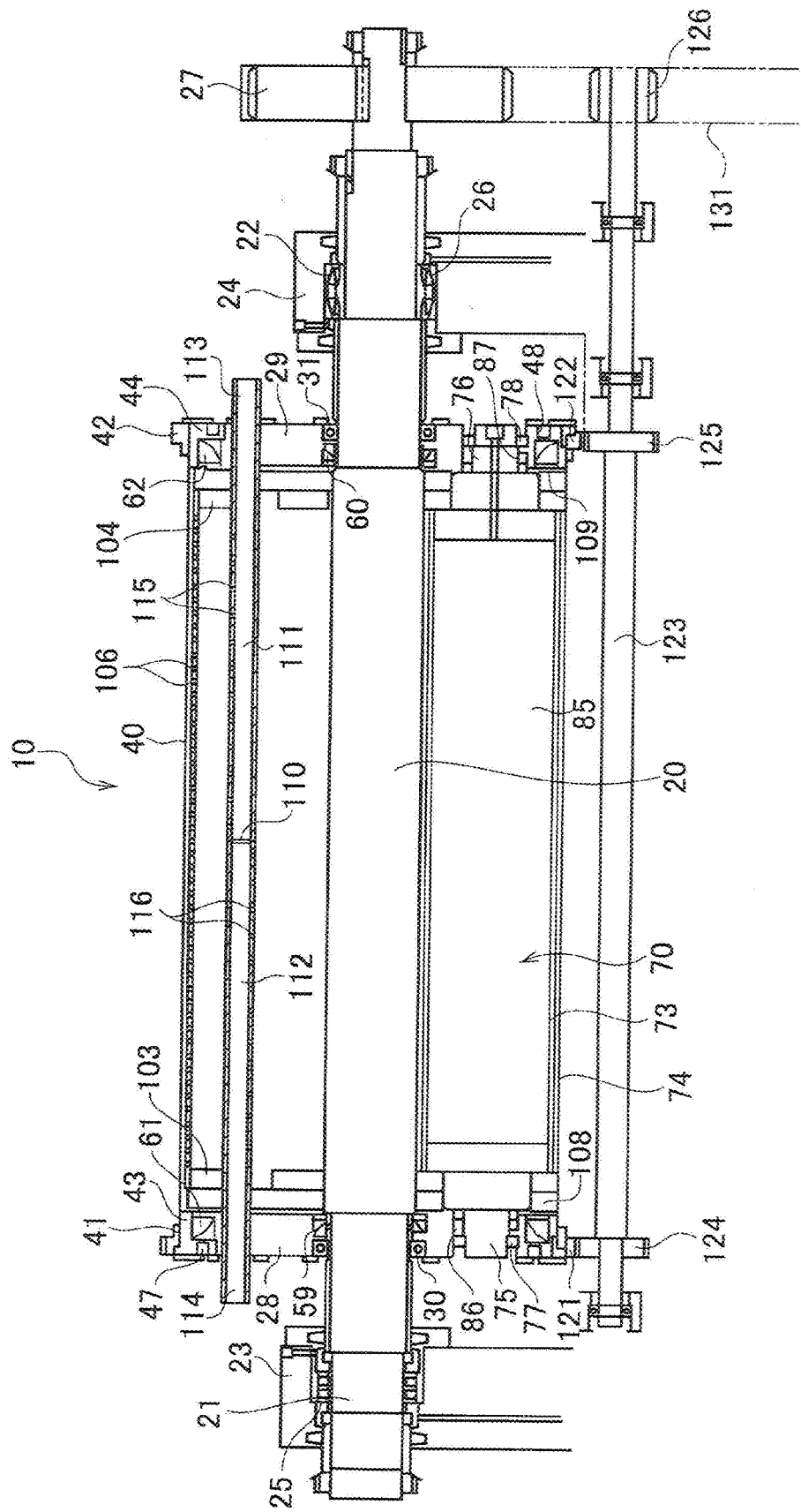
FIG. 13 is a longitudinal sectional view showing a different embodiment of the sheet film forming roll according to the present embodiment.
Figure 14:
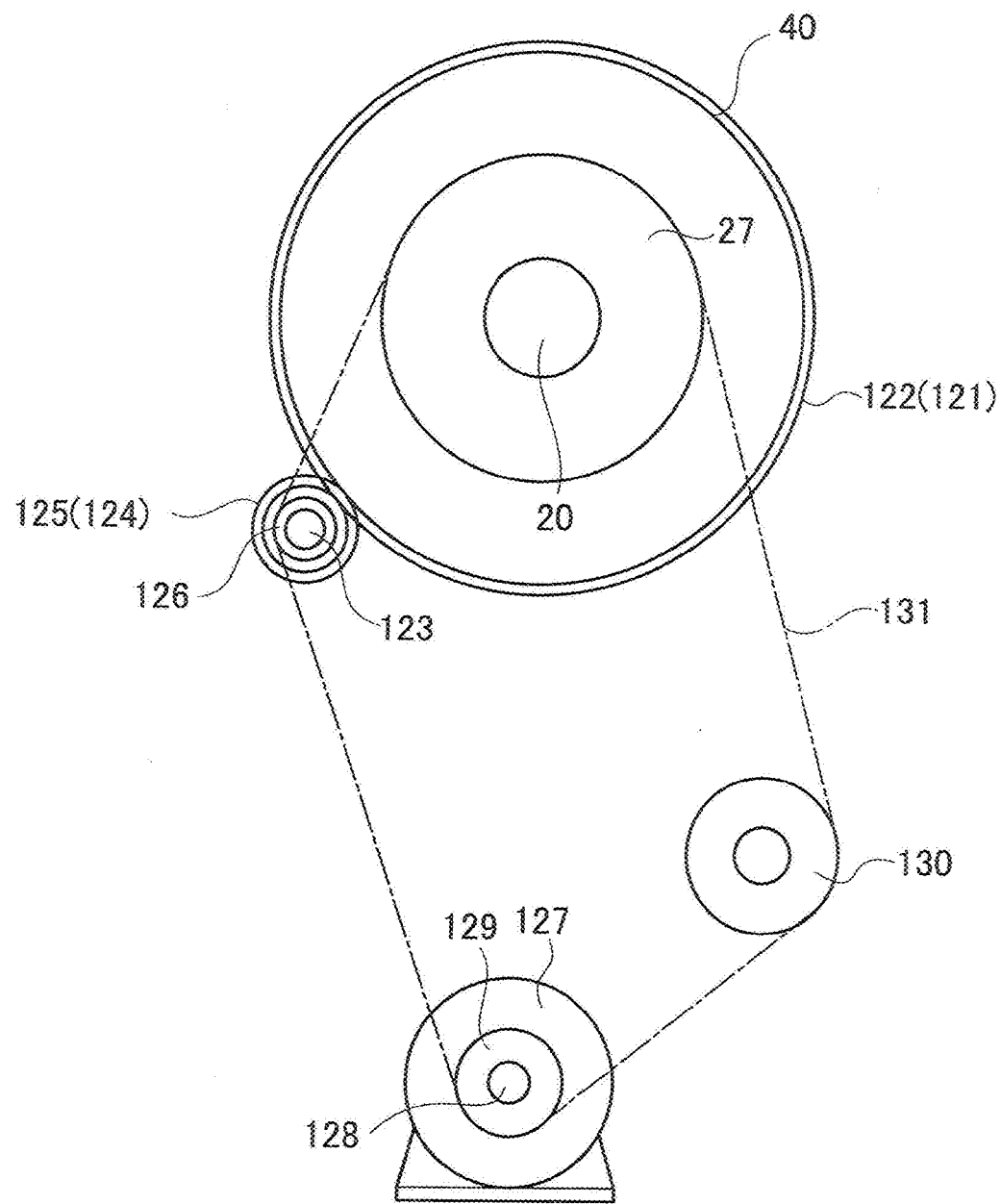
FIG. 14 is an explanatory diagram used to explain a mechanism configured to rotationally drive the sheet film roll according to the different embodiment.

Referring to FIGS. 13 and 14, descriptions will be provided for other embodiments of the sheet film forming roll according to the present invention. In FIGS. 13 and 14, parts corresponding to those shown in FIGS. 1 to 3 will be denoted by the same reference numerals as those used in FIGS. 1 to 4. In addition, duplicated descriptions for the corresponding parts will be omitted.

In this embodiment, the external cylinder 40 is forcedly rotationally driven in addition to the center rotary shaft 20 being rotationally driven. As external-cylinder rotationally-driving members, external gears 121, 122 are formed in the retainer band members 41, 42 located in the left and right ends (the two axial end portions) of the external cylinder 40, respectively. A gear shaft 123 is rotatably provided outside the external cylinder 40 in such a way as to be in parallel with the center rotary shaft 20. Driving gears 124, 125 configured to mesh with the respective external gears 121, 122 are fixedly attached to the gear shaft 123.

A timing pulley 126 is attached to the gear shaft 123. An endless timing belt 131 is hooked among the timing pulleys 126, 27, 130 and the timing pulley 129 attached to an output shaft 128 of an electric motor 127.

By this, the external cylinder 40 is rotationally driven in synchronism with the rotation of the center rotary shaft 20. Because the external cylinder 40 according to this embodiment is rotationally driven in this manner, the rotation of the external cylinder 40 according to this embodiment is more stable than the rotation of the external cylinder 40 according to the foregoing embodiment. Furthermore, the external cylinder 40 is not twisted, even if the length of the external cylinder 40 in the axial direction is long. That is because the external cylinder 40 is rotationally driven as a result of causing the external gears 121, 122 to rotationally drive the retainer band members 41, 42 located in the left and right ends of the external cylinder 40, or as a result of the left and right ends of the external cylinder 40 being rotationally driven.

In the above-described embodiments, the four rolling rubber rolls 70 are disposed in the inside of the external cylinder 40, and the inside of the external cylinder 40 is divided into the four chambers. In addition, the four temperature controlling zones are set in the respective four chambers. Nevertheless, the number of temperature controlling zones is not limited to the four. A necessary minimum number of temperature controlling zones may be set. In other words, the number of temperature controlling zones may be 2, 3, 5 or more.

The present invention is not limited to the scope which has been described, or the scope which has been described with regard to the foregoing embodiments of the present invention. The present invention can be carried out as other various embodiments by modifying the present invention depending on the necessity.

All the contents of Japanese Patent Application No. 2008-139658 (filed on May 28, 2008) is incorporated herein by reference.

What is claimed is:

1. A sheet film forming roll, comprising:
    a center rotary shaft rotatably supported by bearing members;
    fixed end plates concentrically disposed in two locations which are away from each other in an axial direction of the center rotary shaft, respectively;
    an external cylinder made of a metal film, and rotatably supported, at two ends thereof, by the respective fixed end plates, the external cylinder being concentric with the center rotary shaft; and
    a plurality of rolling rubber rolls each rotatably supported, at two ends thereof, by the respective fixed end plates, the plurality of rolling rubber rolls being in sliding contact with an outer peripheral surface of the center rotary shaft, and being in sliding contact with an inner peripheral surface of the external cylinder, wherein
    the rolling rubber rolls divide an annular space between the external cylinder and the center rotary shaft into a plurality of heating medium chambers arranged in a circumferential direction of the sheet film forming roll and adapted to receive a heating medium, and
    at least one of the plurality of heating medium chambers is provided with at least one of a heater which uses electricity as its heat source and a heater which uses steam as its heat source.

2. The sheet film forming roll according to claim 1, further comprising:
    a temperature sensor configured to sense a temperature of the heating medium in the heating medium chamber provided with the heater; and a controller configured to control an amount of heat emitted from the heater depending on the temperature sensed by the temperature sensor.

3. The sheet film forming roll according to claim 2, further comprising:
an adjuster configured to adjust a temperature of another one of the plurality of the heating medium chambers, wherein the another one of the plurality of the heating medium chambers is not provided with the heater.

4. A sheet film casting apparatus comprising: a touch-roll; and a main roll employing the sheet film forming roll according to claim 3.

5. A fine pattern transferring apparatus comprising: a main roll employing the sheet film forming roll according to claim 3.

* * * * *